(12) United States Patent
Shigeta et al.

(10) Patent No.: US 7,979,519 B2
(45) Date of Patent: Jul. 12, 2011

(54) SYSTEM FOR PROVIDING INFORMATION BETWEEN DIFFERENT PROTOCOL ENVIRONMENTS COOPERATIVE WITH EACH OTHER AND A METHOD THEREFOR

(75) Inventors: Yoshiaki Shigeta, Tokyo (JP); Shinya Ito, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 1918 days.

(21) Appl. No.: 10/959,586

(22) Filed: Oct. 7, 2004

(65) Prior Publication Data

US 2005/0091362 A1 Apr. 28, 2005

(30) Foreign Application Priority Data

Oct. 9, 2003 (JP) ................................. 2003-350576
Oct. 31, 2003 (JP) ................................. 2003-371642

(51) Int. Cl.
G06F 15/173 (2006.01)
(52) U.S. Cl. ........ 709/223; 709/224; 709/225; 709/228; 370/349
(58) Field of Classification Search .................. 709/223, 709/228; 370/349
See application file for complete search history.

(56) References Cited

U.S. PATENT DOCUMENTS

| | | | | |
|---|---|---|---|---|
| 6,308,203 B1* | 10/2001 | Itabashi et al. | ................. | 709/217 |
| 6,567,661 B2* | 5/2003 | McDonnell et al. | ....... | 455/426.1 |
| 6,934,756 B2* | 8/2005 | Maes | ............................ | 709/227 |
| 7,028,306 B2* | 4/2006 | Boloker et al. | ................ | 719/310 |
| 7,085,814 B1* | 8/2006 | Gandhi et al. | ................. | 709/208 |
| 7,254,614 B2* | 8/2007 | Mulligan et al. | ............... | 709/207 |
| 7,480,915 B2* | 1/2009 | Costa Requena et al. | .... | 719/311 |
| 7,487,199 B2* | 2/2009 | Idnani | ............................ | 709/200 |
| 7,496,672 B2* | 2/2009 | Orton et al. | ..................... | 709/230 |
| 7,702,726 B1* | 4/2010 | Grabelsky et al. | ............ | 709/204 |
| 2002/0108128 A1* | 8/2002 | Lash et al. | ..................... | 725/148 |
| 2002/0131395 A1* | 9/2002 | Wang | ............................. | 370/349 |
| 2002/0147818 A1* | 10/2002 | Wengrovitz | .................. | 709/228 |
| 2002/0184373 A1* | 12/2002 | Maes | ............................. | 709/228 |
| 2003/0079020 A1* | 4/2003 | Gourraud et al. | ............. | 709/227 |
| 2003/0187992 A1* | 10/2003 | Steenfeldt et al. | ............ | 709/227 |
| 2004/0121765 A1* | 6/2004 | Idnani et al. | ................ | 455/422.1 |
| 2005/0021626 A1* | 1/2005 | Prajapat et al. | ............... | 709/205 |
| 2005/0044233 A1* | 2/2005 | Cai et al. | ......................... | 709/227 |
| 2006/0095508 A1* | 5/2006 | Itabashi et al. | ................ | 709/203 |
| 2008/0140789 A1* | 6/2008 | Mulligan et al. | ............... | 709/206 |

OTHER PUBLICATIONS

Internet Engineering Task Force (IETF) Network Working Group; "SIP: Session Initiation Protocol, Request for Comments: 3261," Jun. 2002.
Javar Community Process; "JSR 116: SIP Servlet API," http://jcp.org/en/jsr/detail?id=116; Dec. 17, 2004; pp. 1-4.
Osamu Nakazawa et al.; "Service Providing System Allowing Flexible Cooperation Between Application Exploiting Different Protocols," U.S. Appl. No. 10/921,343, filed Aug. 19, 2004.

* cited by examiner

*Primary Examiner* — John Follansbee
*Assistant Examiner* — Backhean Tiv
(74) *Attorney, Agent, or Firm* — Rabin & Berdo, P.C.

(57) ABSTRACT

The service providing system uses cooperation managers both in SIP and Web systems to process information of the SIP and HTTP protocols with SOAP/CORBA and the like as a communication protocol that can be handled in common. The service providing system thereby facilitates cooperation between the SIP and Web systems through the SPAP/CORBA network, thereby accomplishing information transfer on a real time basis.

2 Claims, 16 Drawing Sheets

SYSTEM FOR PROVIDING INFORMATION BETWEEN DIFFERENT PROTOCOL ENVIRONMENTS COOPERATIVE WITH EACH OTHER AND A METHOD THEREFOR

CROSS-REFERENCES TO RELATED APPLICATIONS

This application is related to U.S. application Ser. No. 10/959,580 filed on Oct. 7, 2004 and to U.S. application Ser. No. 10/921,343 filed on Aug. 19, 2004.

BACKGROUND OF THE INVENTION

1. Field of the Invention

The present invention relates to an information providing system, and more particularly an information providing system which particularly allows a server in an environment based upon the session initiation protocol (SIP), a typical protocol implementing VoIP (Voice over Internet Protocol), to cooperate with systems separate from each other and providing application software (AP) in an Web (World Wide Web) environment. The present invention also relates to a communication system therefor.

The present invention also relates to a method of providing information to mobile terminals on a real time basis with different server environments cooperating with each other.

The present invention further relates to a service system and a method of providing a service for such an information providing system. More in particular, the invention relates to a system for providing a service to clients connected thereto by causing an application in a SIP environment based on the SIP protocol to cooperate with an application in a web environment. The invention relates to a method of providing a service by causing applications operable in different environments to cooperate with each other, to thereby, for example, implement an alert type application as informing the web browser of the state of progress in a service and the end of the executed service.

2. Description of the Background Art

Applications in providing information are performed on the one hand in the case of being based on the SIP environment and on the other hand in the case of being based on the Web, i.e. World Wide Web environment, and information service takes place in the respective environments. The former, SIP environment or system, is used for building a telephone-based service, while the latter, Web environment or system, is used for building an information providing type of application (AP) service, which is provided by the information systems of enterprises or internet service providers (ISP). The two sorts of services thus exist because they are used in different environments from each other, as described above.

When server environments established by means of different communication protocols are linked and connected with each other, a method is generally employed of intermediating a gateway for converting the protocols. For such a gateway, an HTTP-SIP converting gateway may be used which has both mutually connecting and converting functions of the SIP and HTTP (Hyper Text Transfer Protocol) protocols in order to comply with both of the SIP and Web environments.

There has been used another method in which a client makes access to both Web and SIP servers which respectively provide applications based upon the Web and SIP environments to thereby obtain appropriate information.

However, in the methods described above, the SIP and Web application services are independent from each other. Therefore, for example, when a SIP client, or user, uses both services, he or she could not enjoy on a real time basis an information providing service using the Web application service.

More specifically, when a person travels who has a mobile terminal compatible with the SIP protocol, such as a car navigator, a mobile information terminal (Personal Digital Assistant: PDA), it was impossible for a Web application service to try to present appropriate information on a real time basis for him or her on the basis of his or her ideas, current location, time, date and seasons to thereby make him or her mobile terminal, i.e. a SIP client, enjoy the SIP application service which transfers information consecutively in a touch and transfer mode.

Further, the conventional HTTP-SIP gateway having a HTTP-SIP converting function merely implements a simple function in accordance with the protocol conversion rules incorporated in the gateway be forehand. For the HTTP-SIP gateway, it is impossible, for example, to vary the presence on the database in the SIP environment on the basis of the content requested in accordance with the HTTP protocol and further of the progress in processing to thus inform the user in the SIP environment of the elapse of the processing. When the HTTP-SIP gateway informs the user in the HTTP environment of the elapse of the processing, it would hold the transaction of the HTTP for a longtime. It is thus not considered to be a properly implementable method in view of establishing a user interface as application for effective usage of resources and in practical use.

SUMMARY OF THE INVENTION

It is an object of the present invention to eliminate the disadvantages in the prior art, and to provide an information providing system capable of making applications built on environments different in protocol cooperate with each other to operate applications on a real time basis.

It is also an object of the present invention to provide a method of providing information capable of making applications built on environments different in protocol cooperate with each other to operate applications on a real time basis.

Further, it is an object of the present invention to provide a service system and a method of providing a service capable of making different systems cooperative with each other to mutually inform the systems of the elapsed state of the processing of applications.

In view of solving the above-stated problems, according to the invention, an information providing system communicating with clients connected to systems built in different communication protocol environments to provide said information as service comprises a first cooperation manager comprising a first system operating based on a first communication protocol and a second system operating based on a second communication protocol, the first system including a first cooperation manager for processing the information transmitted to said second system into a third communication protocol used as information for cooperating in common between the first communication protocol and the second communication protocol and processing the information based on the third communication protocol fed from said second system into information of the first communication protocol, and a first location manager for managing location information of a client connected to the first system, said second system including a second cooperation manager for processing information transmitted to the first system into the third communication protocol and processing information based on the third communication protocol fed from the first system into information of the second communication protocol, and a second location manager for accessing to the first location manager in response to a requests of the client connected to said second system to manage the location information of the client connected to the first system that has been obtained from the first location manager.

The information providing system in accordance with the present invention enables easy cooperation between the first system and the second system via the third communication protocol that can be handled in common with use of the first and second cooperation managers, so that information transfer takes place on a real time basis, and information for managing the location information associated with the first system by the first location manager and for managing from the first location manager by the second location manager can be drawn out to thereby achieve sharing of information to be handled regardless of different systems.

Further, in view of solving the problems, according to the present invention, a method of providing information to communicate with clients connected to systems built by different communication protocol environments to provide the information as service comprises a first step of processing the information transmitted from the first system, in communications between the first system operating in response to the first communication protocol and the second system operating in response to the second communication protocol, into a third communication protocol used as information for cooperating in common between the first communication protocol and the second communication protocol and transmitting the same, a second step of processing information of the third communication protocol fed from the second system into information of the second communication protocol and transmitting the same, a third step of processing information of the second communication protocol delivered from the second system into information of the third communication protocol and transmitting the same, and a fourth step of processing information of the third communication protocol fed to the first system into information of the first communication protocol and transmitting the same.

The method of providing information in accordance with the invention transmits and receives information from the third communication protocol possible to be handled in common between the first system and the second system using the first communication protocol and the second communication protocol, respectively, to thus facilitate cooperation between the systems, so that information transfer can be achieved on a real time basis.

In view of solving the above problems, according to the present invention, a service system communicating with respective clients connected to systems built by different communication protocol environments to provide the information as a service, comprises: a first cooperation manager comprising a first system acting based on a first communication protocol and a second system acting based on a second communication protocol, the first system including a first cooperation manager for processing the information transmitted to the second system into a third communication protocol used as information for commonly cooperating between the first communication protocol and the second communication protocol and processing the information based on the third communication protocol fed from the second system into information of the first communication protocol and a first proxy manager for regarding a requested service instance as a client in the first system to manage it virtually as a user agent to handle the information under management, while the second system includes a second cooperation manager for processing information transmitted to the first system into the third communication protocol and processing information based on the third communication protocol fed from the first system into information of the second communication protocol, and a second proxy manager for accessing for the required service instance from the second system through the virtual user agent to a function corresponding to the first proxy manager.

In the service system in accordance with the present invention, when a service instance required by a client connected to the second system is executed, the second proxy manager functions as a proxy user agent (UA) in response to the request by means of the second communication protocol to start up the second cooperation manager. In the second cooperation manager, the request is processed into a request of the third communication protocol and sent to the first cooperation manager where it is processed into a request of the first communication protocol in the first cooperation manager, whereupon processing takes place for the request with a proxy UA function corresponding to the first proxy manager and the response of the processing result is sent out through the first proxy manager, the first cooperation manager, the second cooperation manager and the second proxy manager to the requesting client and displayed, whereby processing of the proxy UA appropriate for the service instance between communication protocols different in type takes place to provide services that have conventionally been impossible.

Further, in view of solving the above problems, according to the present invention, a method of providing service to communicate with clients connected to systems built in different communication protocol environments to provide the information as a service comprises a first step of processing the information transmitted from the first system, in communications between the first system operating in response to the first communication protocol and the second system acting in response to the second communication protocol, into a third communication protocol used as information for commonly cooperating between the first communication protocol and the second communication protocol and transmitting the same, a second step of processing information of the third communication protocol fed from the second system into information of the second communication protocol and transmitting the same, a third step of processing information of the second communication protocol delivered from the second system into information of the third communication protocol and transmitting the same, a fourth step of processing information of the third communication protocol fed to the first system into information of the first communication protocol and transmitting the same, a fifth step of regarding the service instance required from a client connected either to the first system or to said second system as a client in a system at the communicatee side to make it as a proxy for a virtual user agent to thereby generate a first start up signal containing information corresponding to said service instance in response to a proxy access function of accessing to the proxy user agent under management, a sixth step of executing one of processes in a combination of the first and second processes or a combination of the third and fourth processes according to the first start up signal, a seventh step of executing in said system at the communicatee side by the proxy user agent in response to the service instance, an eighth step of generating a second start up signal containing information responding to said information processing by the proxy user agent, a ninth step or executing processes of the other combination according to the second start up signal and a tenth step of returning the response information to the requesting client via the proxy user agent in the system at the communicator side requesting the service instance.

In the method of providing service in accordance with the present invention, when service instance requested from a client connected to the second system is executed, a start up signal is generated with a proxy access function of a proxy user agent (UA) in response to the request in the second communication protocol to process the request into a request of the third communication protocol to cause communication between the systems. Then, the information processing takes place in the first system with a proxy UA function corresponding to the request issued to the first communication protocol, whereupon a second start up signal containing the response information of the processing result is generated by the proxy UA to process the response information into the third communication protocol to execute communication between the systems and the response information is sent out with the proxy access function to the requesting client and is displayed, whereby processing with the proxy UA appropriate for the service instance between communication protocols different in type takes place to provide services that have conventionally been impossible.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Figure 1:
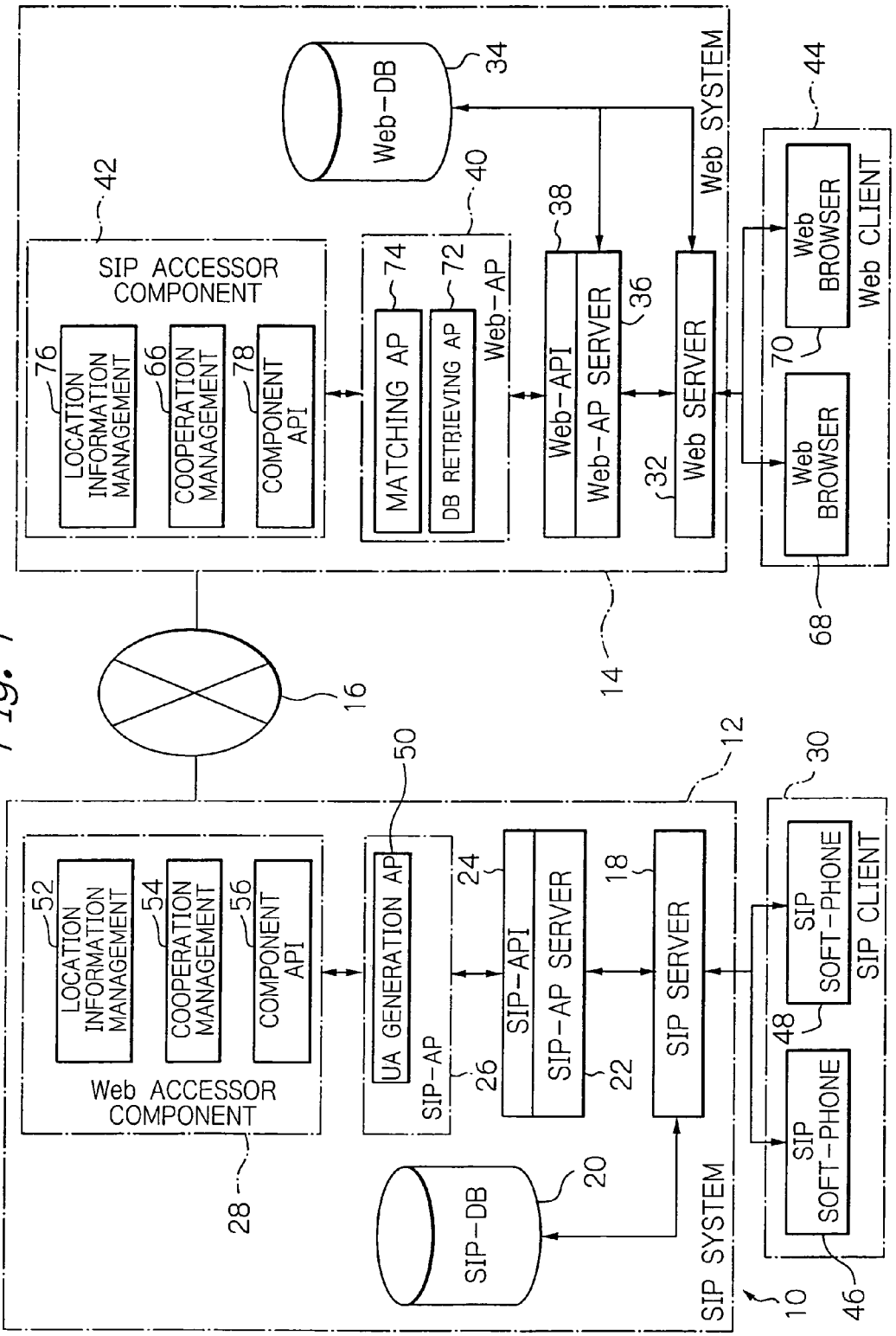
FIG. 1 is a block diagram showing schematic configuration of an embodiment in accordance with the invention in which an information providing system is applied in a service providing system.

In the following, preferred embodiments of an information providing system in accordance with the invention will be described in more detail in reference with the accompanying drawings. Referring first to FIG. 1, an illustrative embodiment of an information providing system in accordance with the invention solves the problem of extensibility of applications involved by using a conventional HTTP-SIP conversion gateway or by an access made by a client itself to SIP and web servers, as well as uses a configuration and a method capable of building flexible cooperation between the SIP and Web applications to enable a client to use the services of both SIP and Web applications by simply accessing either to the SIP or Web environment. Description will be omitted on portions not directly relevant to the invention. In the following description, signals are denoted with reference numerals of respective connections on which they appear.

The embodiment shows a case where an information providing system is applied in a service providing system 10. The service providing system 10, as shown in FIG. 1, comprises a SIP system 12 and a Web system 14 connected with each other through a network 16. The SIP system 12 and the Web system 14 may be configured on network environments belonging to different network domains, as well as the SIP system 12 and the Web system 14 are provided with function blocks supplementing the Web and SIP environments that both systems do not inherently have. Thereby, the service providing system 10 is equipped with respective environments corresponding to respective systems configured on an LAN environment in a server's computer or in the same domain.

The network 16 in the embodiment is a SOAP (Simple Object Access Protocol)/CORBA (Common Object Request Broker Architecture) network and plays a role to transfer information between the SIP system 12 and the Web system 14. The SOAP is a communication protocol in which the rules are prescribed for data formats or processing of messages interchanged between Web services. The network 16 transfers SOAP messages in accordance with the rules between clients requesting services, service providers and service mediators. The CORBA is a dispersion object technique framed by OMG (Object Management Group).

The SIP system 12 includes a SIP server 18, a SIP database (SIP-DB) 20, a SIP application server (SIP-AP Server) 22, a SIP application interface (SIP-API) 24, a SIP application (SIP-AP) 26, a Web accessor component 28 and a SIP client 36 as illustrated. Further, also as shown, the Web system 14 includes a Web server 32, a Web database (Web-DB) 34, a Web application server (Web-AP server) 36, a Web application interface (Web-API) 38, a Web application (Web-AP) 40, a SIP accessor component 42 and a Web client 44. In the following, those components will be described in brief.

The SIP server 18 is adapted for responding to requests from clients based on the SIP protocol, which is a protocol for a client-server model communicating in an end-to-end manner. It has a function of handling and managing the SIP protocol in conformity with, for example, RFC (Request For Comments) 3261 regulated particularly by IETF (International Engineering Task Force). Among the managing functions, the SIP server 18 generally includes three server functions, i.e. a SIP proxy server function, a SIP registrar server function and a SIP location server. Firstly, the SIP proxy server function is of transferring a SIP message as a proxy for a client. Secondly, the SIP registrar server function is of managing the registration of a client. Thirdly, the SIP location server has the function of managing address information of the registered clients. The SIP server 18 is connected, for example, to a SIP soft-phones 46 and 48 which are components of the SIP client 30 and transfer information provided from the SIP-AP server 22 in the form of SIP messages.

The SIP database 20 is a storage for storing therein, for example, user information, presence information, location information, etc., managed by the SIP server 18 and associated with each other. The database 20 is connected to the SIP server 18, and has the function of providing information according to a request for retrieval from the SIP server 18. User information in the SIP database 20 provides and certifies or authenticates client addresses. Presence information is representative of whether a client is connected to the SIP system 12, whether a client is started up and used, and whether another client is in connection thereto. As seen from the information, the SIP database 20 stores information representing the state of a client. Location information stored in the SIP database 20 is representative of an area or region where a client is located.

The SIP-AP server 22 is a server that operates an application managed by the SIP server 18 based on a SIP protocol according to the operation thereof. The SIP-AP server 22 is connected to the SIP server 18 and the SIP-AP interface 24, respectively. The SIP-AP interface 24 has the functions of operating an application in response to a SIP request received in the SIP server 18 and of issuing a request to the SIP server 18. The SIP request includes an establishment of a session, an acknowledge response of confirmation, a termination of conversation and a change in presence.

The SIP-AP interface 24 is provided from the SIP-AP server 22. The SIP application 22 is connected via the SIP-AP interface 24 to the SIP application 26. In the SIP-AP interface 24, there is a SIP Servlet application interface that is under standardization in JCP (Java (Trademark) Community Process).

The SIP application 26 is built by the SIP-AP interface 24 connected thereto to operate on the SIP-AP server 22. The SIP application 26 includes an UA (User Agent) generating application 50. The UA generating application is a function that is owned by a user agent, i.e. an end system, such as application software, which has the function of acting as a UA client in generation of a SIP request as well as acting as a UAS (UA server) in generation of a response after the request is processed.

Figure 2:
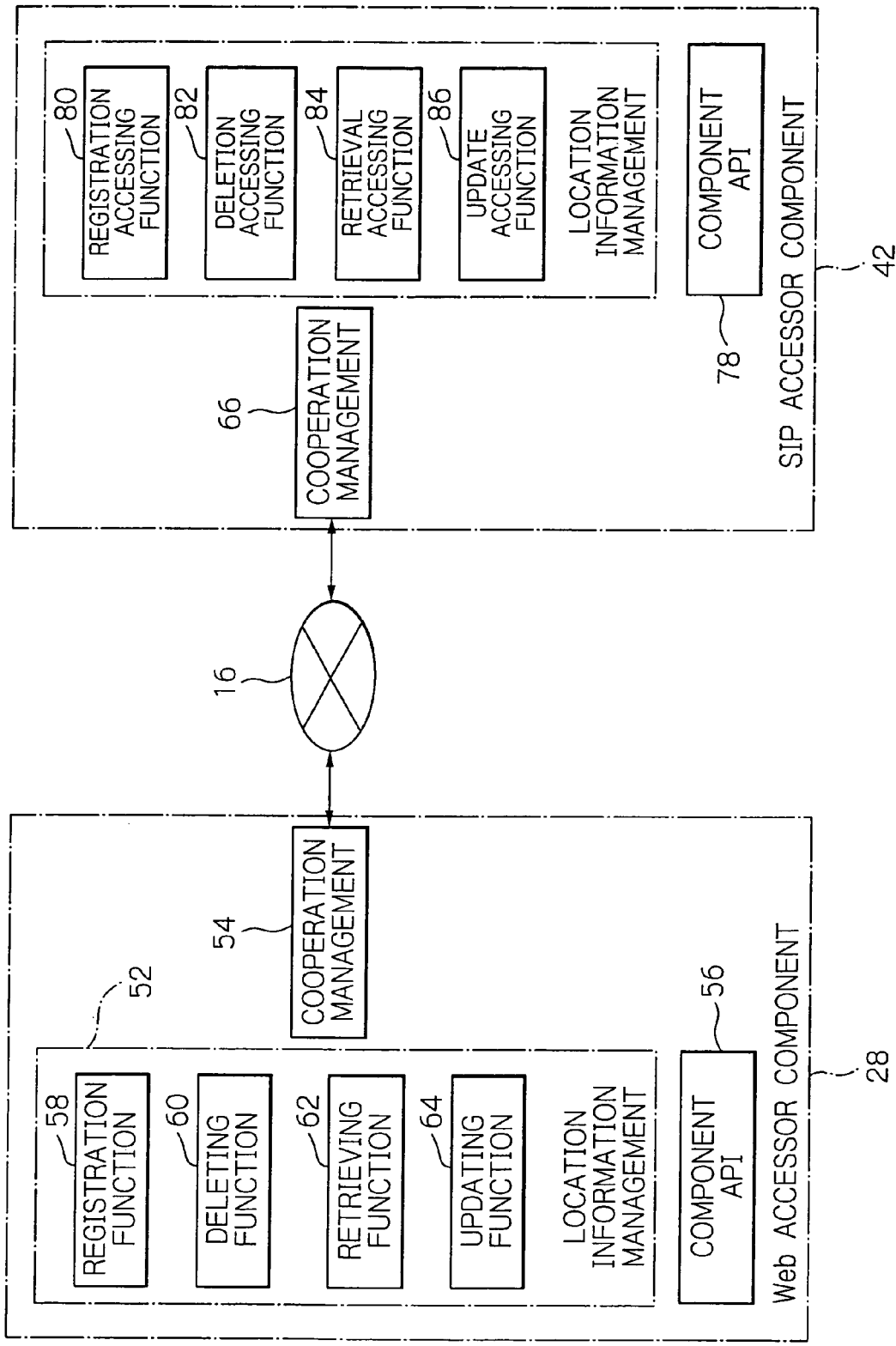
FIG. 2 is a schematic block diagram showing a configuration of accessor components shown in FIG. 1.
Figure 3:
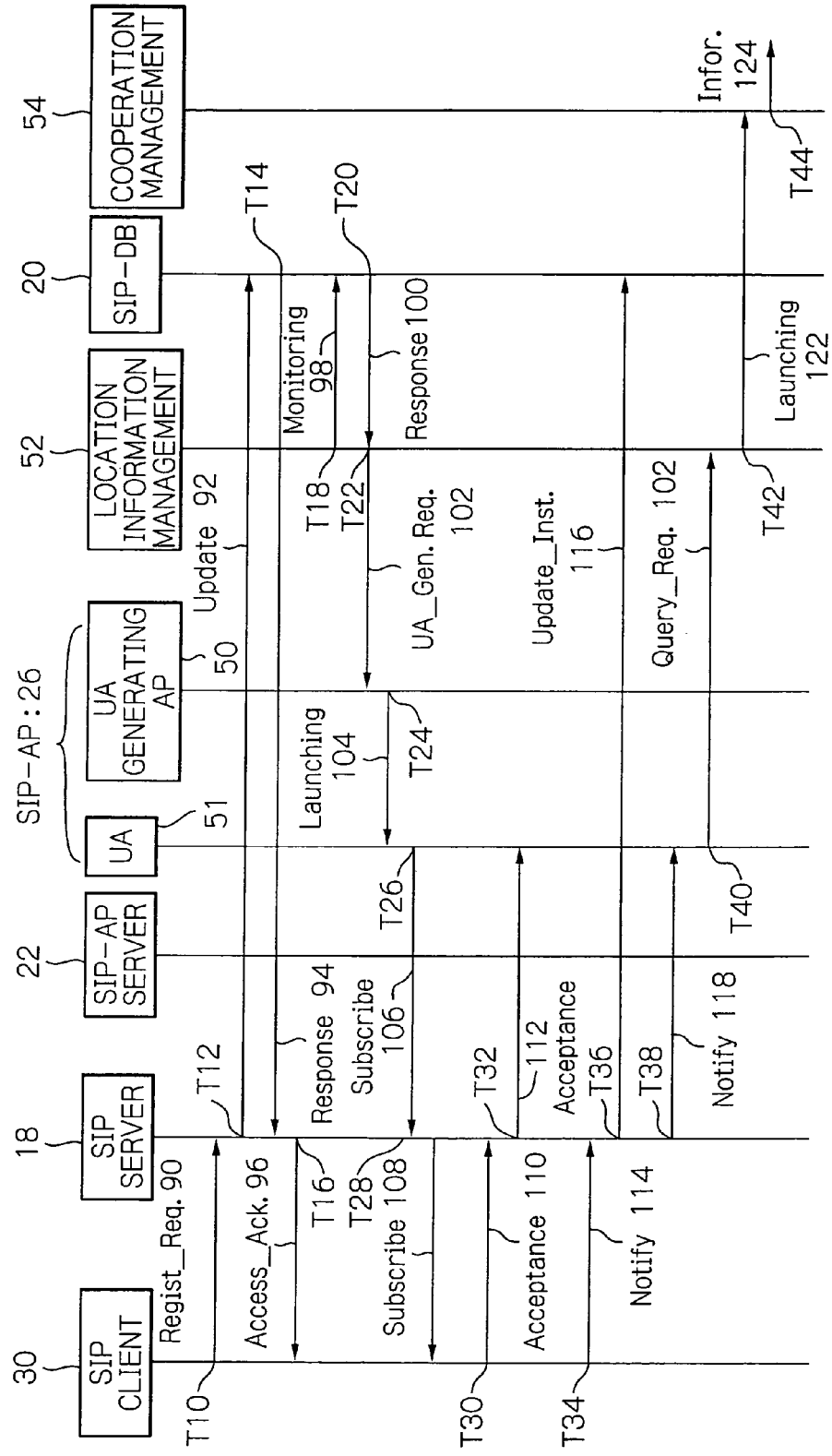
FIG. 3 is a sequence chart useful for understanding the operation procedure for providing services to the SIP clients in the service providing system shown in FIG. 1.

The Web accessor component 28 is a general term for a component group by means of which the SIP application 26 cooperates with the Web system 14, and the individual components represent library software parts. Accordingly, the Web accessor component 28 is called whenever the SIP application 26 acts and is used when communication is established with the SIP accessor component 42, described later, of the Web system 14. The Web accessor component 28 includes, as shown in FIG. 2, a location information management section, or manager, 52, a cooperation management section 54 and a component application interface (component API) 56. In more detail, the location information management section 52 is a component for operating and managing location information managed within the SIP system 12. The location information management section 52 includes a registering function part 58 required for management, an eliminating function part 60, a retrieving function part 62 and an updating function part 64. The registering function part 58 is a module for registering location information of a user. The eliminating function part 60 is a module for deleting the registered location information. The retrieving function part 62 is a module for retrieving the registered location information. Further, the updating function part 64 is a module for editing the registered location information.

The cooperation management section 54 cooperates with the corresponding cooperation management section in the Web system 14, and has the function of managing a communication environment to access to the location information management section 52 from or to the side of the Web system 14. The cooperation management environment includes setting of environments for the SOAP and CORBA protocols.

The component application interface 56 is adapted for using a corresponding component by the SIP application 26.

In addition, the Web accessor component 28 is not confined to the above-described configuration, but may be combined from the side of the SIP application 26 for use, depending on what type of function as the SIP application 26 is desired to specifically be implemented, and can be expanded according to every purpose of use from time to time to other components than those described above. It is needles to say that by means of added or expanded components, variations in the cooperation with the Web system 14 are also added and expanded.

In the following, the Web system 14 will be described, going back to FIG. 1. The Web server 32 is adapted for handling and managing based on the HTTP protocol. The Web server 32 is connected to Web browsers 68 and 70 that are components of a Web client 44. Also, the Web server 32 is connected to the Web database 34 and Web-AP server 36 to manage them.

The Web database 34 is a storage for housing information that the Web server 32 manages and sometimes has the function of providing information in response to a retrieval request from the Web server 32. Information to be stored includes every type of information and logs used. Also, every type of information described above includes information, such as restaurants, stores and shops, special favors, guides, etc., and they are stored respectively in a manner capable of providing to the Web client 44. The Web database 34 is connected not only to the Web server 32 but also to the Web-AP server 36 to make it possible to provide data.

The Web-AP server 36 is always ready to be operative and is adapted for operating applications managed by the Web server 32 based on the HTTP protocol, i.e. a protocol of the Web. As a Web-AP server 36, for example, TOMCAT of open source, Web Logic (Trademark) of BEA System, Inc., etc., is applicable. The Web-AP server 36 is connected to the Web-AP interface 38 through the Web application 40. The Web-AP server 36 may operate an application based on information of the Web database 34.

The Web-AP interface 38 is provided by the Web-AP server 36. As typical AP interfaces, there are an HTTP Servlet AP interface that has been regulated by the J2EE (Java2 Enterprise Edition) environment and the EJB (Enterprise Java Beans). The Web-AP interface 38 enables information to interchange between the Web-AP server 36 and the Web application 40.

The Web application 40, which is built by the Web-AP interface 38 connected thereto, is adapted for operating on the Web-AP server 36 and is connected also to the SIP accessor component 42. The Web application 40 includes, for example, a matching application (AP) 72 and a DB retrieving application 74. The matching application 72 collates, when the location information of a user agent is updated, the registration information of the user agent associated with the location information with information on the updated location, update time information represented with time or seasons and the history information, etc., to transmit the adapted information to the user agent in the form of message. The DB retrieving application 74 extracts from the Web database 34 the registration information, updated location information, update time information and the history information of a user agent associated with the afore-mentioned location information.

The SIP accessor component 42 is a general term of a component group, through which the Web application 40 cooperates with the SIP system 12, and is library software called at the time when the Web application 40 acts. There exists, for example, the following components and AP interfaces: The SIP accessor component 42 is used when the Web application 40 communicates with the Web accessor component on the SIP system 12. Also in this case, like in the case of the Web accessor component 28, the Web application 40 can be used in combination from the side of the Web application 40, depending on what function is desired to be implemented in cooperation with the SIP application 26. The SIP accessor component 42 can be expanded from time to time according to every purpose of use, and by means of addition and expansion, variation of cooperation with the SIP system 12 is also added and expanded.

The SIP accessor component 42 includes, for example, a location information management section 76, a cooperation management section 66 and a component AP interface 78, as shown in FIG. 2. The location information management section 76 is a component arranged in the Web system 14 in order to access from the Web system 14 to the location information management section 52 managed by the SIP system 12. This brings the service providing system 10 an access function from the side of the Web system 14. The location information management section 76 includes as a module a registration access function part 80, an elimination access function part 82, a retrieval access function part 84 and an update access function part 86, as illustrated.

The cooperation management section 66 comprises a management function with a communication environment for cooperating with the corresponding cooperation management system 54 in the SIP system 12, and uses the location information management section 76 to access to the side of the SIP system 12 or to the side of the Web system 14 from the side of the SIP system 12. The cooperation management environment includes, for example, the setting of environments compatible with the SOAP and CORBA protocols.

In the communication between the cooperation management section 66 and the cooperation management section 54, for example when the location information retrieval function of the SIP system 12 is used from the Web system 14 side, a retrieving stub for location information is called in order to access to the function of the retrieval access function part 84 from a remote environment to thereby communicate through the cooperation management section 54. At this instance, which stub is to be called depends on what is used in the network 16 to realize the remote access. In the embodiment, a stub of CORBA is utilized when CORBA is used for cooperation, while a stub for SOAP access is utilized when SOAP is used for cooperation.

The component AP interface 78 enables the Web application 40 to use a component associated therewith.

In this way, the cooperation between the systems is managed so as to eliminate constraint articles caused by data conversion, with the result that an application enabling automatic transfer of information can be constructed in the system as a whole. By means of this construction, information in the respective systems can be shared to allow smooth utilization hereof.

In the following, the service system 10 will be described for the communicating procedure. Here, description will be made on the assumption that the SIP client 30 enjoying the service has completed its user registration in the SIP database 20 beforehand. The embodiment will be described as to the procedure of operation from a point where the SIP client accesses, for example, to an IP network to be provided with a service from the service providing system 10 through the IP network to a point where the service terminates.

The operation procedure mainly includes four steps and description will be given firstly for a step of authenticating and registering a SIP client 30 in the service providing system 10 in response to an access from the SIP client 30, secondly for a step of starting the service followed by the completion of the authentication and registration of the SIP client 30, thirdly for a step of monitoring the move of the SIP client 30, and fourthly, a step of terminating the service, in order.

The SIP client 30 accesses the SIP system 12 of the service providing system 10 via the IP network. In such a case, in the authenticating and registering processes, the SIP client 30 first logs on to the IP network. At time T10 the SIP client 30 issues a request signal for requesting connection (Regist_Req.) 90 to the SIP server 18 of the SIP system 12 in order to enjoy the information providing service from the service providing system 10 at real time.

At time T12, the SIP server 18 sends out the user registration information contained in the request signal for requesting connection from the SIP client 30 as an updated information 92 to the SIP database 20 in order to confirm whether or not the SIP client 30 in question has been registered for the real time-based information providing service. As user registration information, ID (Identification), passwords and URL (Uniform Resource Locator) may be used. Provided to the SIP database 20 at this instance is location information of the SIP client 30. The SIP database 20 certifies the registered user registration information and, upon confirmation thereof, sends out at time T14 to the SIP server 18 a response signal (Response) 94 having a value indicating conformity to then register the supplied location information in the SIP database 20. When the user registration information is negated, it is regarded as being unregistered and then a response signal 94 having a value indicating in conformity is sent out to the SIP server 18.

The SIP server 18 receives at time T16 the retrieved result in the form of the response signal 94 from the SIP database 20 to generate an access acknowledge signal (Access_Ack.) 96 responsive to the SIP client 30 and sends it out to the SIP client 30. In more detail, the SIP server 18, when the registration and authentication has been completed for the response signal 94 at this instance, sends out to the SIP client 30 an indication of the status of approving the connection of the SIP client 30, i.e. The access response signal 96 (200 OK) bringing the log-on state. Further, the SIP server 18, when fed with a response signal 94 indicating negation, sends out to the SIP client 30 a response signal 96 (Notify) including information indicating the refusal of access as well as an indication on whether or not it should be registered. When the SIP client 30 desires registration, then the procedure advances to a registration process, not shown.

In the following, description will be given for operation from time T18 to the start of the service after the SIP client 30 is connected to the SIP system 12. The location information management section 52 issues a monitor requesting signal (Monitoring) 98 for monitoring from time to time an access status of whether a new SIP client 30 has logged on, i.e. is connected to, the SIP database 20 at time T18. When participation of a new SIP client 30 is confirmed at time T20 from the client status indication of the SIP database 20, then the SIP database 20 delivers at time T22 a response signal (Response) 100 to the location information management section 52. The location information management section 52 issues a UA generating request signal (UA_Gen._Req) 102 in response to the fed response signal 100 like in the case of generating a user agent 51, a counter part of the session, of the SIP client in a UA generating application 50.

In the SIP application 26, a launching signal (Launching) 104 is fed to a UA generating application 50 stored as one of the SIP applications at time T24 in response to the UA generating request signal 102 to thus start up an application, whereby a user agent 51 is generated. The user agent 51 sends out at time T26 a subscription method information (Subscribe 106) to the SIP server 18.

The SIP server 28 confirms by the method from the new user agent 51 that a user agent has been generated and sends out at time T28 a method (Subscribe 108) to request the SIP client 30 to issue notification when the current location status changes.

The SIP server 18 confirms that the SIP client 30 has accepted, at time T30 with a status code (200 OK) transmitted in the form of acceptance signal (Acceptance) 110 from the client 30. The SIP server 128 then transmits at time T32 the status code (200 OK) in the form of acceptance signal (Acceptance) 112 to the user agent 51, whereby the SIP system 12 becomes in the state of starting the service.

Hereinafter, description will be given for the case when the SIP client 30 moves. When the location of the SIP client 30 changes, the SIP client 30 issues at time T34 a status altering request signal to the SIP server 18 by means of a notifying method (Notify 114). The SIP server 18, based on the status altering request signal, instructs at time T36 to update the location information of the SIP client of the SIP database 20 (Update_Inst. 116) in question. The SIP database 20 updates the location information of the instructed SIP client. Also, the SIP server 18 supplies at time T38 a method (Notify 118) indicating the move of the SIP client 30 to the user agent 51 and confirms it.

The user agent 51 issues at time T40 a location information retrieving request signal (Query._Req.) 120 in order to retrieve information in a new location of the SIP client 30 to thus supply it to the location information management section 52. The location information management section 52 starts up the retrieving function part or subsection 62 so as to include therein as an access module in response to the location information retrieving request signal 120. The location information management section 52 supplies at time T42 the cooperation management section 54 with information included in the location information retrieving request signal in the form of start up signal (Launching) 122 to thereby start up the cooperation management section 52.

Figure 4:
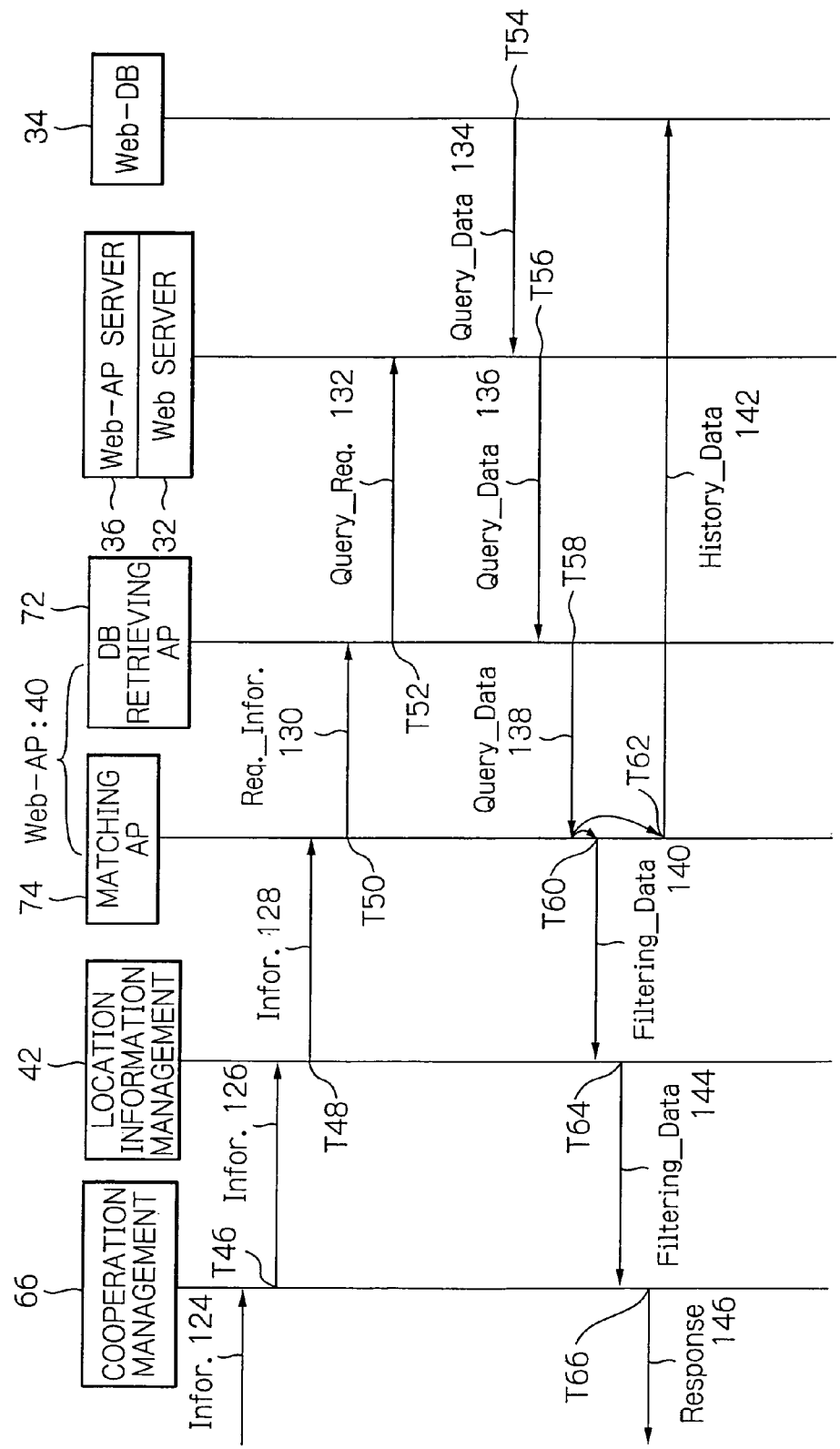
FIG. 4 is a sequence chart, like FIG. 3, useful for understanding the procedure followed by the operation procedure in FIG. 3.

At time T44, the cooperation management section 54 starts up the location information management section 66 on the web side as shown in FIG. 4 and uses either the SOAP or CORBA protocol in the Web system 14 in order to transmit retrieval request information (Infor.) 124, to thereby communicate with the cooperation management section 66 arranged in the Web system 14 as a separate domain on the network 16. The cooperation management section 54, when using, for example, SOAP, receives a start up signal 122 and supplies SIP protocol start up and retrieval request information (Infor.) 124 to the Web system 14 side by intermediating it, for example, as a SOAP request bound with the HTTP protocol in order to supply the start up and retrieval request information (Infor.) 124 as useful communication via the network 16 to the cooperation management section 66 without fail.

The cooperation management section 66 handles at time T46 the supplied information (Infor.) 126 as a start up signal in response to the HTTP protocol and supplies it to the location information management section 42 to start up the location information management section 42. In the location information management section 42, the information (Infor.) 128 as a start up signal is supplied at time T48 to a matching application 74 to start up the matching application 74. The matching application 74 delivers at time T50 to a DB retrieval application 72 request item information (Req._Infor) 130 in the form of start up signal of the DB retrieval application 72 retrieved from the Web database 34 recommendable information and the past transmission log or history information in the personal registration information (within an area) and location (within an area) of the SIP clients.

The DB retrieving application 72 starts up an application according to a start up instruction from the matching application 74 and transmits at time T52 retrieval request information (Query_Req.) 132, a request item, to the Web database 34 via the Web server 32/Web-AP server 36. The Web database 34 receives the retrieval request information 132 and starts the retrieval. The Web database 34 transmits at time T54 the retrieved result (Query_Data) 134 to the Web-AP server 36/Web server 32. The Web-AP server 36/Web server 32 transmits at time T56 the retrieved data (Query_Data) 136 to the DB retrieving application 72 and then the DB retrieving application 72 delivers at time T58 the retrieved result (Query_Data) 140 to the matching application 74.

The matching application 74 extracts recommendable information (Filtering_Data/Matching_Data) at random from the personal registration information (preference of meals, play, behavior patterns, family members, and others), location (within an area), past transmission log information, time and seasons of the SIP client, provided that a method for extracting the information depends on application to be used.

The matching application 74 transmits at time T60 the extracted information 140 to the location information management section 42 as well as registers at time T62 the extracted information 140 as transmission log information (History_Data) 142 of the SIP client in the Web database 34. The location information management section 42 delivers at time T64 the extracted information 140 thus supplied as the extracted information, an answer of the retrieved result, to the cooperation management section 66. In the cooperation management section the function of managing cooperation is started up by means of the supply of the extracted information 144.

Figure 5:
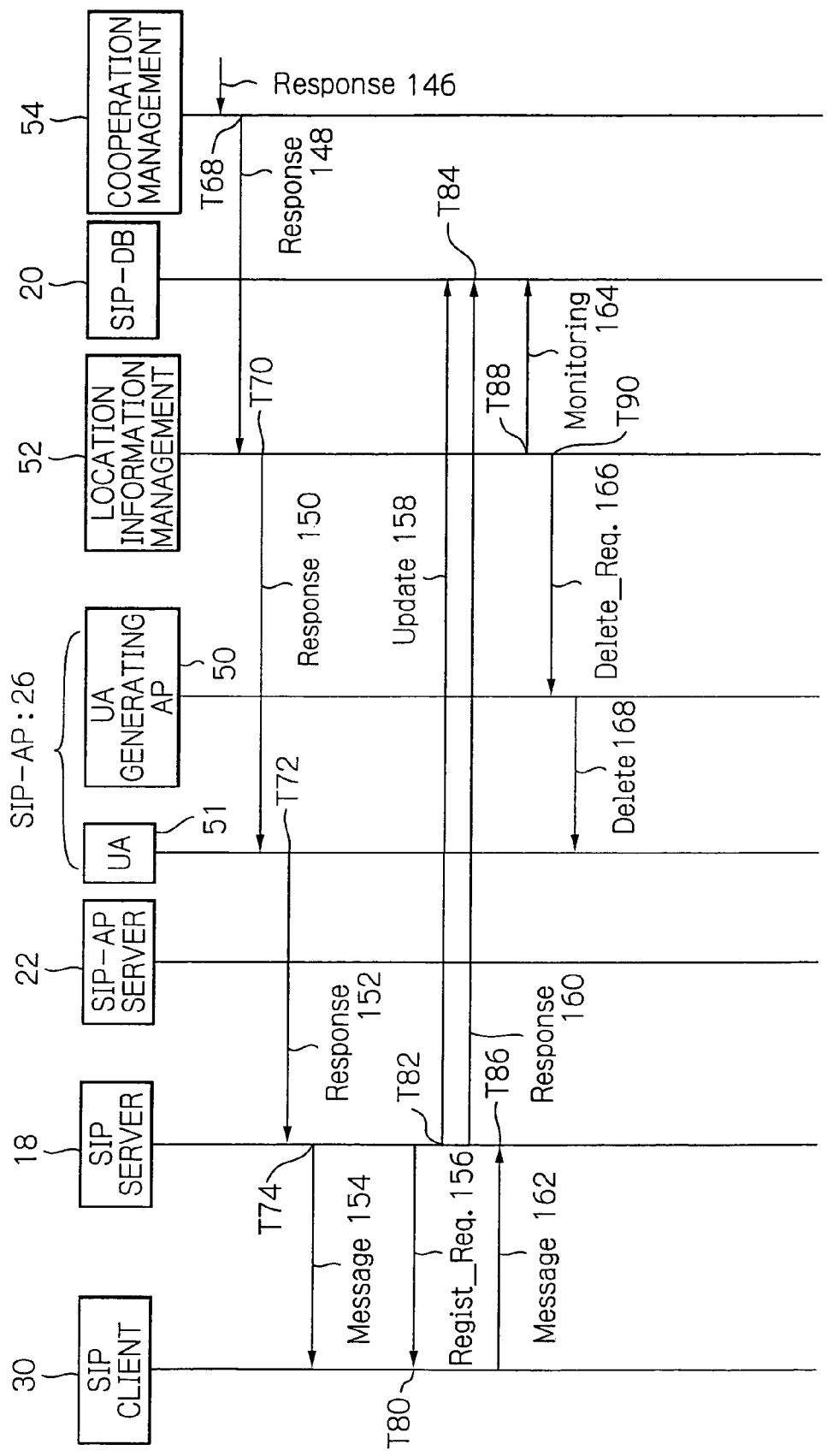
FIG. 5 is a sequence chart, like FIG. 3, useful for understanding the procedure followed by the operation procedure in FIG. 4.

The cooperation management section 66 chooses to use either the SOAP or the CORBA to communicate with the cooperation management section 54. At this instance, the extracted information 144 supplied based on the HTTP protocol is delivered at time T66 as a response signal (Response) 146, a SOAP response, to the cooperation management section 54 shown in FIG. 5 via the network 16, when the cooperation management section 66 uses, for example, the SOAP.

The cooperation management section 54 handles the response signal 146 including the supplied extracted information as a response signal 148 based on the SIP protocol. The cooperation management section 54 delivers at time T70 the converted response signal 148 to the location information management section 52. The location information management section 52 receives the retrieved result of the Web and delivers at time T72 a response signal 150 to the user agent 51.

The user agent 51 transmits at time T72 a response signal 152 as an acknowledgement to the request to the SIP server 18. The SIP server 18 transmits at time T74 the information supplied in a new location from the user agent 51 as a message.

The SIP client 30 receives from the SIP server 18 information of a new location as a service. In this way, the SIP client 30 accesses to the SIP system 12 and receives in the SIP system 12, as a service, the information obtained from the retrieving process of the information requested to the Web system 14 in response to the moved location of the SIP client 30.

When the service is terminated, the SIP client 30 issues at time T80 a termination request signal (Regist_Req.) 156 as a method (Register) to the SIP server 18. The SIP server 128, based on the termination request signal sent from the SIP client 30, executes at time T82 registration and status alteration (Update 158). The SIP database 20 alters the display of the connection status of the client stored therein to a log-ff status as well as deletes the location information. The SIP database 20 delivers at time T84 a response signal (Response) 160, the result of operation, to the SIP server 18. The SIP server 18 transmits at time T86 the result of the received signal from the SIP database 20 to the SIP client as a message 162.

Further, the location information management section 52 monitors (Monitoring 164) at time T88 the SIP database 20. With this monitoring, the location information management section 52, after confirming that the access of the relevant SIP client in the SIP database 20 has been disconnected, requests (Delete_Req. 166) at time T 90 to the UA generating application 50 to delete the user agent 51. The UA generating application 50 deletes (Delete 168) the user agent 51 temporarily generated.

When operated in the way descried above, the applications constructed on the SIP system 12 and the Web system 14 become mutually cooperative. More specifically, a service providing system 10 is constructed with applications of VoIP and Web cooperating to facilitate the execution and use thereof. Particularly, by constructing a UA generator application 50 as an application on the SIP side, it is possible to temporarily generate a communicatee only when the SIP client 30 accesses thereto. This makes it possible in the service providing system 10 to provide services from a plurality of service providers to a plurality of SIP clients, rather than from a sole service provider to a plurality of SIP clients. The system 10 thus brings about an effect that a reliable service can be provided even in the case of a violent increase in traffic.

Still further, the SIP system 12, and the Web system 14, respectively, include the location information management section 52 and the cooperation management section 54, and the location information management section 76 and the cooperation management section 60. The SIP client can therefore start up from the SIP system 12 the matching application 74 and the DB retrieving application 72 that are applications of the Web system 14 and can provide the SIP system 12 on a real time basis with the result obtained from the retrieval in the Web system 14 as a service. In the embodiment, the SIP client 30 can, when moved, receive various real time information dynamically updated on certain conditions in a touch and transfer mode, depending on a service to be provided.

Figure 6:
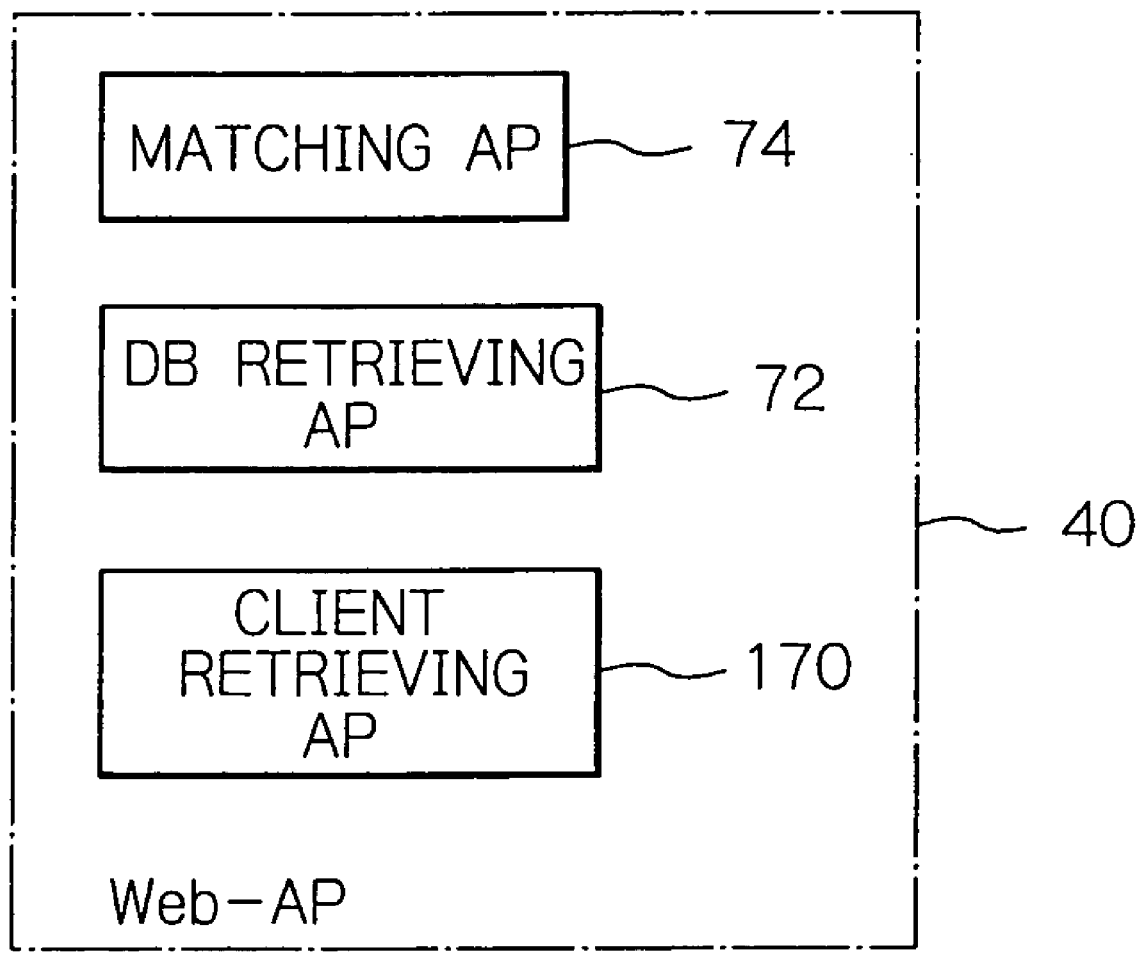
FIG. 6 is a schematic block diagram of an alternative embodiment of the Web application shown in FIG. 1.

In the following, an alternative embodiment of the Web application 40 of the service providing system 10 will be described. With reference to FIG. 6, the Web application 40 additionally includes a client retrieving application 170. The client retrieving application 170 is adapted for retrieving location information of a SIP client to transmit it to a Web client 44.

In the Web client 44 there are browsers 68 and 70 for receiving services, as shown in FIG. 1. The Web browsers 68 and 70 should be regarded as have been registered in the SIP database 20 or the Web database 43 beforehand.

Figure 7:
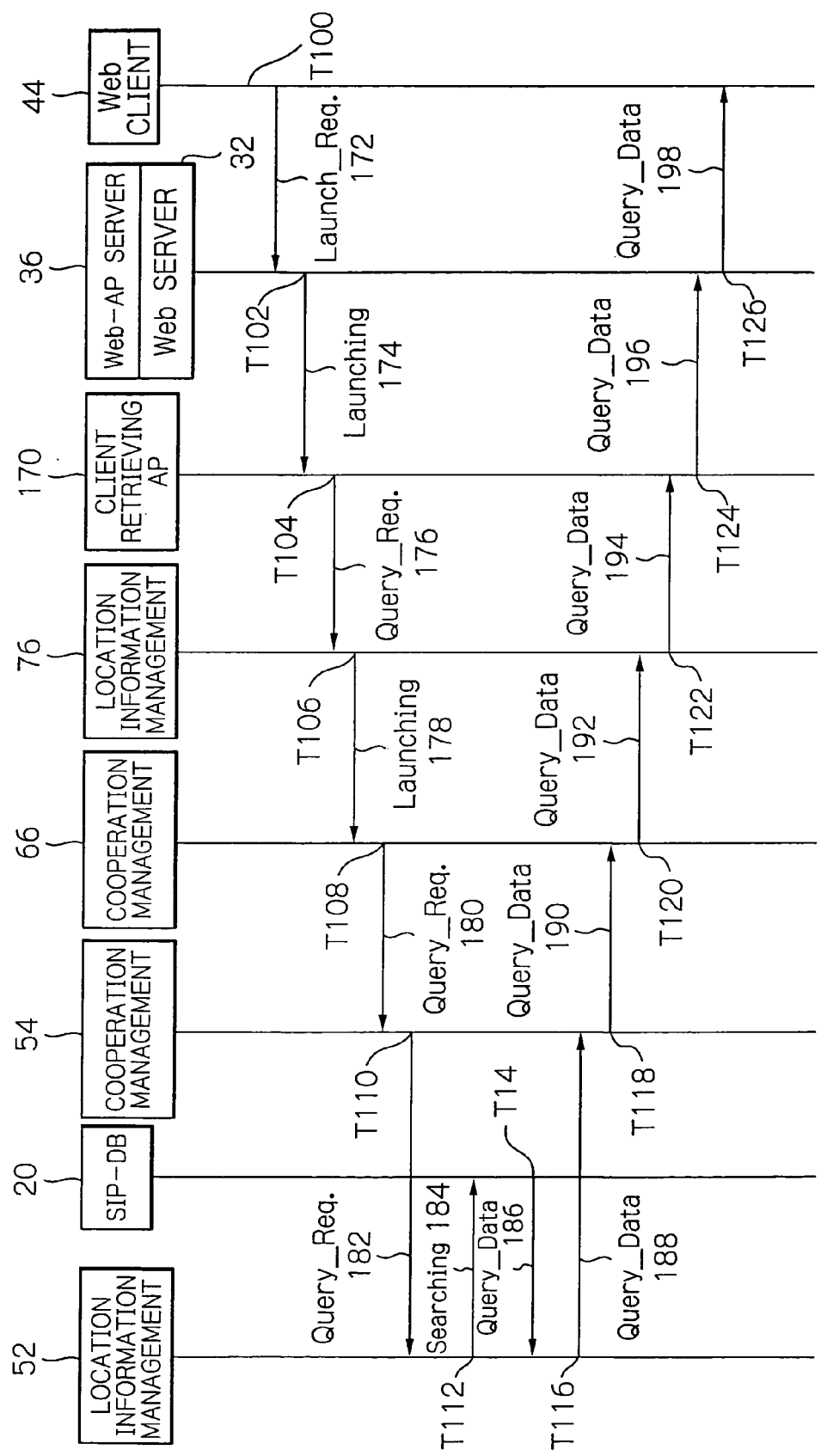
FIG. 7 is a sequential chart, like FIG. 3, useful for understanding the procedure for a request from the Web client in the service providing system shown in FIG. 1.

The alternative embodiment is the same as the former embodiment except that the location information of the SIP client 30 is obtained from the Web client 44 through the Web system 14. This newly added step will be described with reference to FIG. 7.

The Web client 44 requests at time T100 a start up request signal (Launch_Req.) 172 of the client retrieving application 170 to the Web-AP server 36. Generally, the start up instruction is executed using a GUI (Graphical User Interface) displayed on the Web browsers and provided from the Web server side. The Web-AP server 36 supplies at time T102 a start up signal (Launching) 174 to the client retrieving application 170 to start it up.

The client retrieving application 170 issues an information retrieval request signal (Query_Req.) 176 for retrieving information of which SIP client exists in a specified area for the location information management section 76. The client retrieving application 170 delivers at time T104 the issued information retrieval request signal 176 to the location information section 76.

The location information management section 76, on receiving the information retrieval request signal 176, delivers at time T106 a start up signal (Launching) 178 for starting up the cooperation management section 66 according to said signal. The start up signal 178 includes the retrieval request information.

The cooperation management section 66 process at time T108 the retrieval request information supplied based on the HTTP protocol to match it with a protocol used in the SOAP/CORBA network 16 and delivers an information retrieval request signal (Query_Req.) 180 corresponding to the selected protocol.

Supplied to the cooperation management section 54 is the supplied information retrieval request signal 180 in a protocol form through the SOAP/CORBA network 16. The cooperation management section 54 transmits the supplied information retrieval request signal 180, after processing it into an information retrieval request signal 182 corresponding to the SIP protocol, to the location information management section 52.

The location information management section 52 starts up on receiving the information retrieval request signal 182 and retrieves (Searching 184) the SIP database 20 at time T112 based on the retrieval request information contained in the information retrieval request signal 182. The SIP database 20 obtains the retrieved data of the relevant SIP client 30 from the retrieval request information. The SIP database 20 delivers at time T114 the obtained retrieved data (Query_Data) 186 to the location information management section 52. The location information management section 52 delivers at time T116 the retrieved data (Query_Data) 188 to the cooperation management section 54.

The cooperation management section 54, when using, for example the SOAP, processes the retrieved data to be supplied 188 as a SOAP response and delivers at time T118 the retrieved data (Query_Data) 190 thus obtained to the cooperation management section 66 on the Web side through the SOAP/CORBA network 16.

The cooperation management section 66 transmits at time T120 to the location information management section 76 the retrieved data (Query_Data) 192 processed to be able to be handled with the HTTP protocol. The location information management section 76 transmits at time T122 the retrieved data (Query_Data) 194 to the client retrieving application 170. The client retrieving application 170 transmits at time T124 the supplied retrieved data (Query_Data) 194 as a retrieved data (Query_Data) 196 to the Web-AP server 36/Web server 32. The Web server 32 supplies at time T126 the supplied retrieved data 196 as a retrieved data (Query_Data) 198 to the relevant browser of the Web client 44 to display the retrieved data 198 on that Web browser.

In this way, the Web application 40 including the client retrieving application 170 allows service providers to obtain the location information of the SIP client from the Web browsers. In other words, it is expected that service providers for providing services to the SIP clients can efficiently provide their services, such as public relations, advertisements, etc., based on the location information of the SIP clients.

Figure 8:
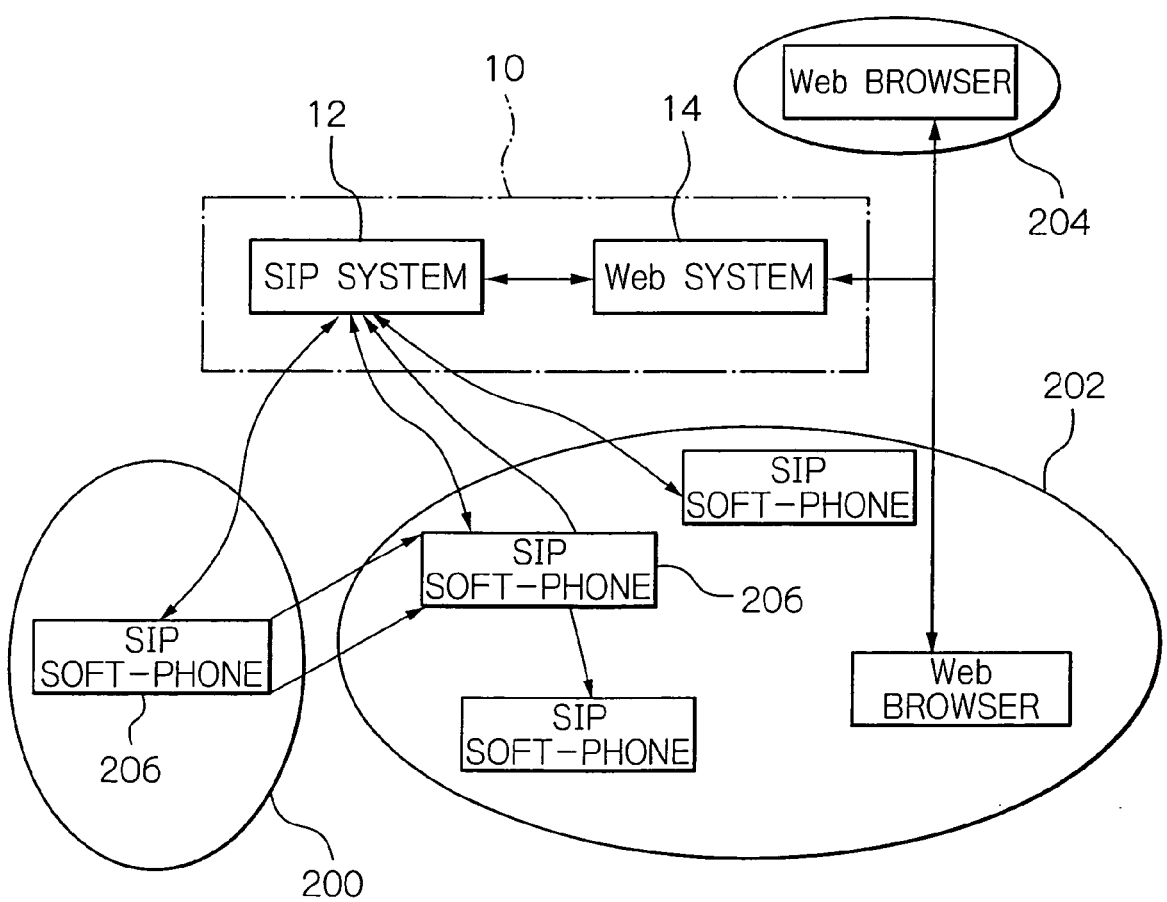
FIG. 8 illustrates how the service is provided by the service providing system.

For example, as shown in FIG. 8, there are areas 200, 202 and 204 formed around the service providing system 10. In the areas 200, 202 and 204, there exist users or operators of a car navigator, PDA, etc., in addition to SIP soft-phones and Web browsers. A user of the SIP soft-phone 206 moves from an area 200 to another area 202. The user of the SIP soft-phone 206, having registered his or her preference and taste in the service providing system 10 beforehand, can receive with its move the optimal information appropriate for the current season, current location and current time as an information providing service in the SIP soft-phone 206 on a real time base. Also, when the service providing system 10 is used, the Web clients, such as stores, etc., can be informed of, for example, the status of the SIP soft-phones present in an area 202 through the SIP system 12.

The present invention may be used, for example, in a commodity distribution management service for managing location information with a SIP client implemented as a SIP-IC (Integrated Circuit) tag, a taxi delivery service for managing location information with a SIP client implemented as a taxi, and a parking space information service for managing vacant space information with a SIP client implemented as a sensor installed in the parking space.

Figure 9:
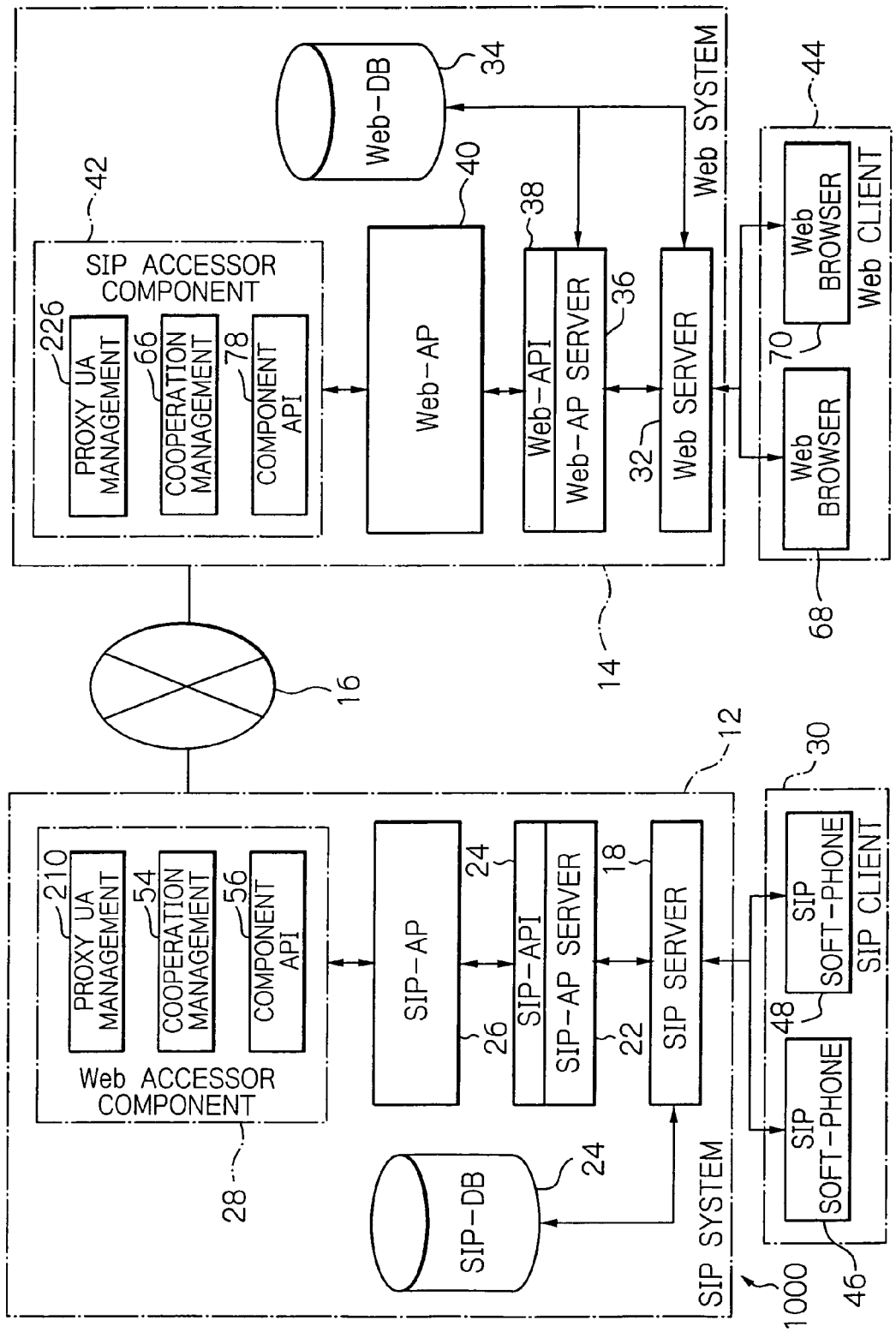
FIG. 9 is a schematic block diagram showing an alternative embodiment of a service providing system applied in the service system in accordance with the invention.

In the following, another alternative embodiment of the invention will be described in more detail. Referring to FIG. 9, the alternative embodiment of a service system in accordance with the invention has solved the problem with the executability of correct notification of the processing state of the SIP and Web applications, which were unsolved problem in a conventional cooperative type of HTTP-SIP conversion gateway and the like. The clients, regardless of being on either the SIP or Web environment, can know the processing state of applications by means of the configuration and method of establishing a flexible cooperation between the SIP and Web applications.

The embodiment is directed to a case where a service system of the present invention is applied in a service providing system 1000. The service providing system 1000, as shown in FIG. 9, comprises the SIP system 12 and the Web system 14 that are connected through the network 16. The SIP system 12 and the Web system 14 are arranged on network environments belonging to different network domains as well as include respective function blocks essentially not involved in the SIP system 12 and the Web system 14. Those functional blocks are adapted for mutually supplementing the Web environment and the SIP environment, respectively. Thereby, the SIP system 12 and the Web system 14 in the service providing system 1000 are provided with respective environment corresponding to systems to be arranged in a LAN environment within a server computer or the common domain. In the following, like elements are designated with the same reference numerals and redundant description may sometimes be omitted for simplicity.

The network 16 in the embodiment is a SOAP/CORBA network and plays a role to transfer information between the SIP system 12 and the Web system 14. As stated earlier, the SOAP prescribes the rules for formats and processing of messages interchanged with the Web services. Through the network 16 SOAP messages according to the rules are mutually transacted among service requesters, service providers and service mediators.

The SIP system 12 includes a SIP server 18, a SIP data base (SIP-DB) 20, a SIP application server (SIP-AP server) 22, a SIP application interface (SIP-API) 24, a SIP application (SIP-AP) 26, a Web accessor component 28 and a SIP client 30, as shown in the figure. The Web system 14 includes a Web server 32, a Web database (Web-DB) 34, a Web application server (Web-AP server) 36, a Web application interface (Web-API) 38, a Web application (Web-AP) 40, a SIP accessor component 42 and a Web client 44. In order to avoid intricacy due to redundant description of the components same as those in the previous embodiments, description of the components will be omitted except for the Web accessor component 28 and the SIP accessor component.

Figure 10:
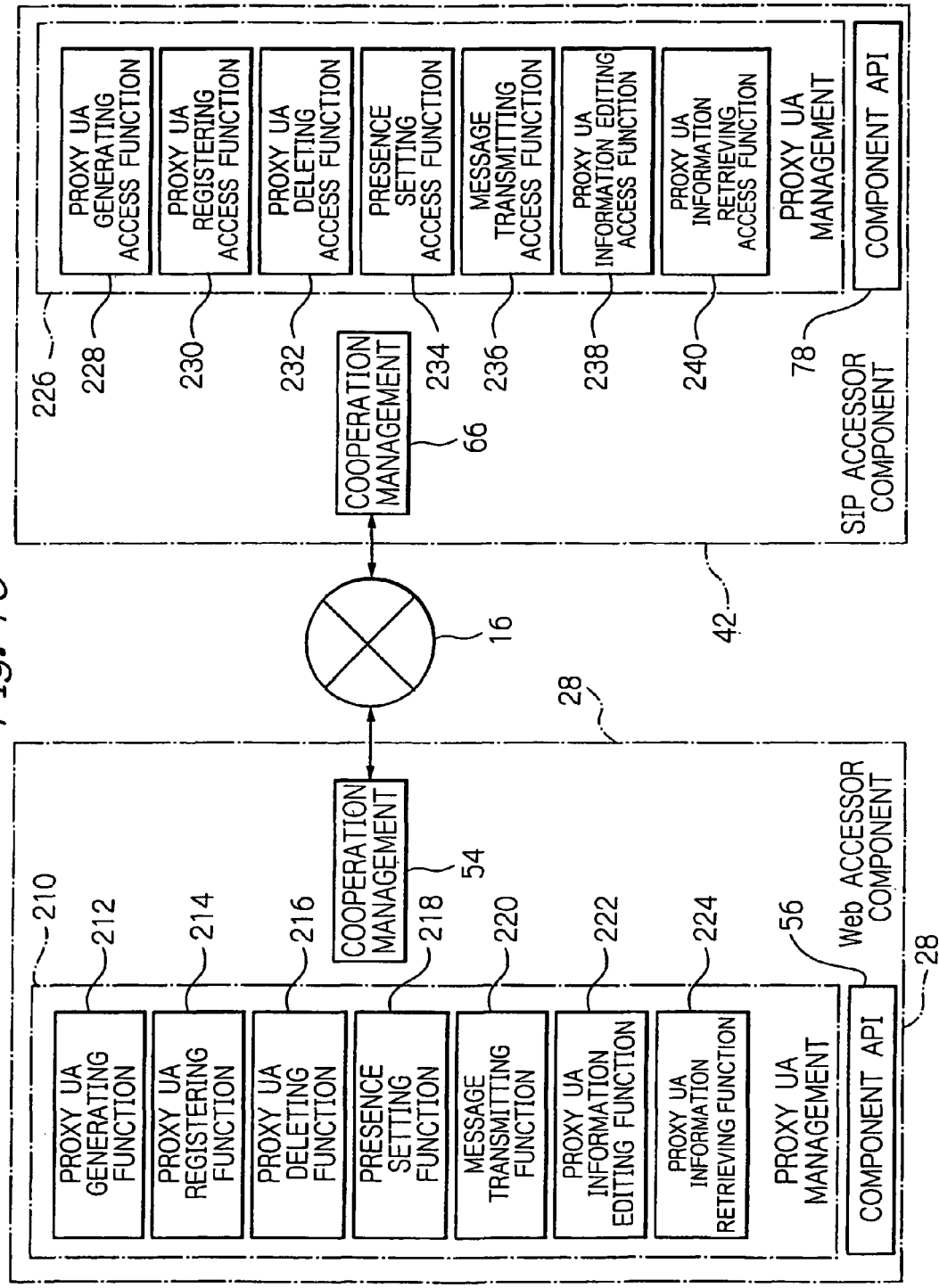
FIG. 10 is a schematic block diagram, like FIG. 2, showing an alternative configuration of the accessor component shown in FIG. 9.

Again, the Web accessor component 28 is a general term of a component group through which the SIP application 26 cooperates with the Web system 14, and each component represents a library software part. Accordingly, the Web accessor component 28 is called when the SIP application acts and used when communication takes place with the SIP accessor component 42, described later. The Web accessor component 28 includes, for example, a proxy UA management section 210, a cooperation management section 54 and a component application interface (Component API) 56, as shown in FIG. 10.

In still more detail, the proxy UA management section 210 is a component for operating and managing the service proxy UA information in the SIP system 12. In particular, the manager 210 manages a service instance as a user agent (UA) virtually by regarding it as a SIP client. The proxy UA management section 210 includes, as shown in FIG. 10, function parts of every type for managing a user agent appropriate for a service instance. In other words, it includes a proxy UA generating function part 212, a proxy UA registering function part 214, a proxy UA deleting function part 216, a presence setting function part 218, a message transmitting function part 220, a proxy UA information editing function part 222 and a proxy UA information retrieving function 224.

The proxy UA generating function part 212 is a module for generating a user agent appropriate for a service instance. The proxy UA registering function part 214 is a module for registering a user agent appropriate for a service instance. The proxy UA deleting function part 216 is a module for deleting a user agent appropriate for a service instance. The presence setting function part 218 is a module for updating presence information of a user agent appropriate for a service instance. The message transmitting function part 220 is a module for transmitting a UA message, i.e. a text string, specified by a user agent appropriate for a service instance. The proxy UA information editing function 222 is a module for editing user information of a user agent appropriate for a service instance. The proxy UA information retrieving function 224 is a module for retrieving user information of a user agent appropriate for a service instance.

The cooperation management section 54 comprises a function of managing, in cooperation with a corresponding cooperation management section in the Web system 14, a communication environment where an access is made for the proxy UA management part 210 from the Web system 14 side or to the Web system 14 side. The cooperation management environment includes, for example, environment setting and the like according to SOAP and CORBA protocols.

The component application interface 56 is an interface through which the SIP application 26 uses a corresponding component.

In addition, the Web accessor component is not confined to the component described above, but may be combined from the SIP application 26 side, depending on what function is specifically implemented as the SIP application 26. Expansion can be made from time to time to components other than that described above according to every purpose of use. It is useless to say that by means of addition and expansion of the components, variation in cooperation with the Web system 14 is also added and expanded.

In the following, the SIP accessor component 42 in the Web system 14 will be described with reference to FIG. 9. The SIP accessor component 42 is a general term of a component group through which the Web application 40 cooperates with the SIP system 12 and is a library software called when the Web application starts its action. For example, it includes components and AP interface described later. The SIP accessor component 42 is used when the Web application 40 communicates with the Web accessor component 28 on the SIP system 12. In this case also, the Web application 40 can be used to be combined with the Web application 40 side like in the case of the Web accessor component 28, depending on what function in cooperation with the SIP application 26 is implemented. The SIP accessor component 42 can be expanded from time to time according to every purpose of use, and by means of addition and expansion, variation in cooperation with the SIP system 12 is thus added and expanded.

The SIP accessor component 42 includes, as shown in FIG. 10, for example a proxy UA management part 226, a cooperation management section 66 and a component AP interface 78. The proxy UA management part 76 is in the Web system 14 and adapted for accessing the service proxy UA information managed in the SIP system 12. By means of this component the service providing system 1000 accesses to the SIP system side from the Web system 14 side to provide the Web browser the service proxy UA information read out from the SIP system to the Web system 14. The proxy UA management part 228 includes, as shown in FIG. 10, a proxy UA generation accessing function part 228, a proxy UA registration accessing function part 230, a proxy UA deletion accessing function part 232, a presence setting accessing function part 234, a message transmission accessing function part 236, a proxy UA edition accessing function part 238 and a proxy UA retrieval accessing function part 24 as respective modules.

The proxy UA generation accessing function part 228 is a module for accessing the proxy UA generating function part 212 on the SIP system 12 side from the inside of the Web system 14. The proxy UA registration accessing function part 230 is also a module for accessing the proxy UA registering function part 214 on the SIP system 12 from the inside of the Web system 14. Correspondingly, the proxy UA deletion accessing function part 232 is a module for accessing the proxy UA deleting function part 216 on the SIP system 12 side from the inside of the Web system 14.

The presence setting accessing function part 234 is a module for accessing alteration of the presence state of the service from the inside of this function part 234 to alter the presence of a proxy UA through the presence setting function part 218 on the SIP system 12 side. The result of presence alteration is notified to a watcher of the presence information through the SIP server 18. The message transmission accessing function part 236 is a module for accessing change in the progressing status of the service from the inside of this function part 236 to frame and transmit a message of the proxy UA through the message transmitting function part 220 on the SIP system side. The message is notified through the SIP server to a receiving side.

The proxy UA information edition accessing function part 238 is a module for accessing the proxy UA editing function part 22 on the SIP system 12 side from the inside of the Web system 14. Further, the proxy UA information retrieval accessing function part 240 is a module for accessing the proxy UA information retrieving function part on the SIP system 12 side from the inside of the Web system 14 side.

The cooperation management section 66 has the function of using the proxy UA management part 226 in cooperation with the corresponding cooperation management section 54 in the SIP system 12 to manage a communication environment where an access is made to the SIP system 12 side or an from the SIP system 12 side to the Web system 14 side. The cooperation management environment includes, for example, environments compatible with the SOAP or CORBA protocols.

Communication between the cooperation management sections 54 and 66 proceeds, for example, when the retrieving function of the proxy UA management in the SIP system 12 is used from the Web system 14 side, through the cooperation management section 54 by calling a retrieving stub of the proxy UA in order to access to the function of the retrieval accessing function part 240 from a remote environment. A stub to be called at this instance depends upon what is used in the network 16 to accomplish a remote access. In the embodiment, a stub for a SOAP access is used in the case of using SOAP, while a tub for a CORBA access is used in the case of using CORBA.

The component AP interface 78 is provided to permit the Web application 40 to use a corresponding component.

In this way, it is possible to build up an application for managing the cooperation between the respective systems, for taking out, for example, the registered information based on a function which is appropriate for the service instance and the proxy UA management has, and for the requesting clients with the obtained information regardless of using different systems. In other words, cooperation between applications built on the Web and SIP environments becomes possible to facilitate the Web-VoIP cooperative type of applications to be constructed, executed and operated. With the construction described above, the respective systems can share information with each other to allow smooth use.

Figure 11:
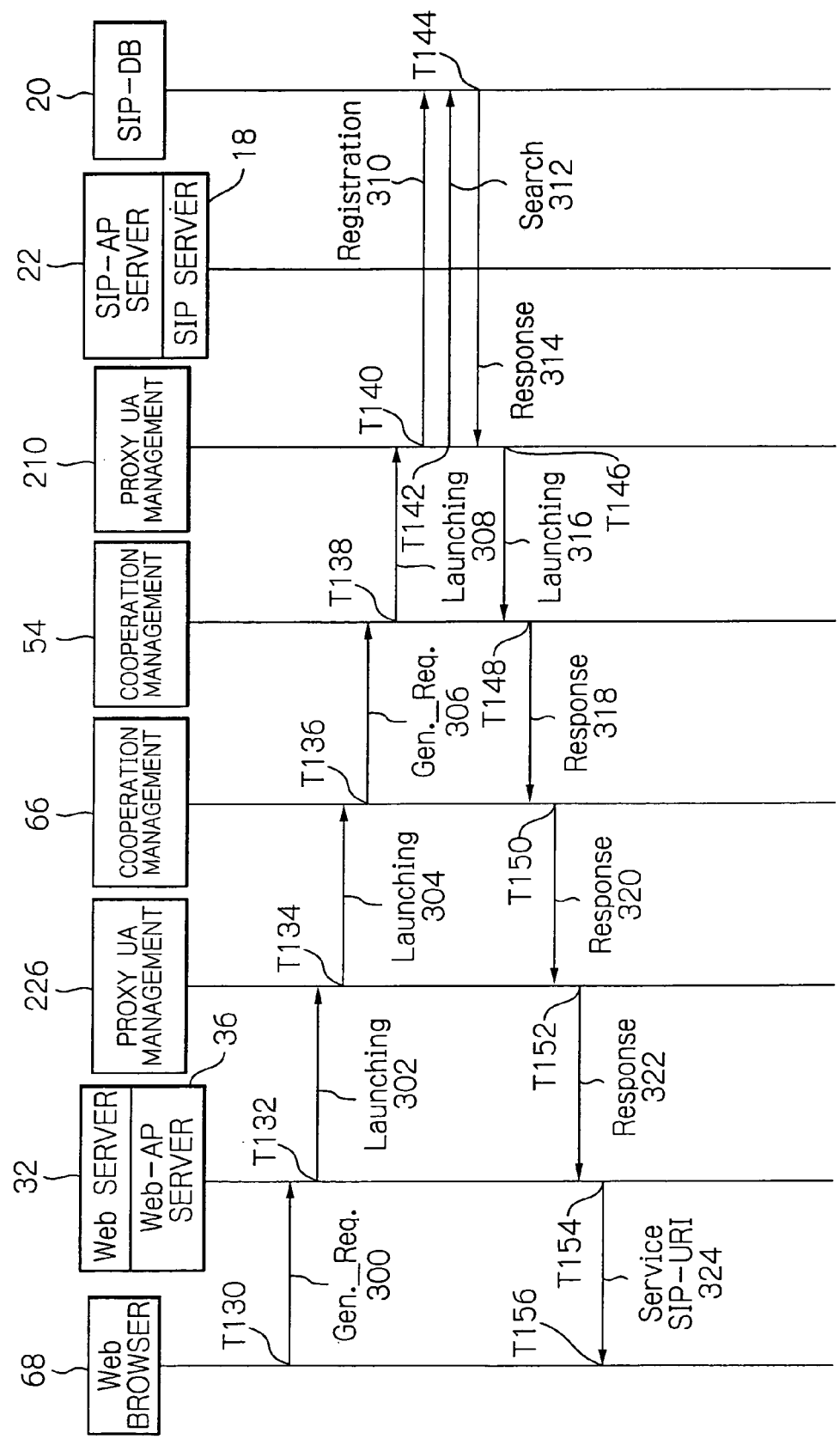
FIG. 11 is a sequence chart, like FIG. 3, useful for understanding the operation procedure for a service generation request in the service providing system shown in FIG. 9.

In the following, the communication procedure of the service providing system 1000 will be described. Operation of generating a service proxy UA using proxy UA management parts 210 and 228 will be described with reference to FIG. 11.

For example, a browser 68 issues at time T130 a request for execution of "service generation" (Service Generation Request Signal: Gen.REQ.). Here, the requested information includes requesting information, such as retrieving information, message information to be transmitted, as well as user information. The user information includes information concerning contracts, such as user's names, addresses, ages, etc., and those used for certification or authentication at the time of using information systems. In general, this request is issued using a GUI (Graphical User Interface) provided by the Web server 32 displayed on the Web browser 68. A service generation request signal is sent out to the Web server 32/Web-AP server 36.

The Web server 32/Web-AP server 36, based on the "service generation request" thus supplied, uses the component AP interface 78 in the proxy UA management part 226 on the Web side to supply at time T132 a start up signal (Launching) 302 to the proxy UA generation accessing function part 228 in order to start up the proxy UA generation accessing function part 228. The proxy UA generation accessing function part 228 supplies at time T134 a start-up signal (Launching) 304 to the cooperation management section 66 to start it.

The cooperation management section 66, in order to transmit information to the proxy UA management part 54 in the SIP system 12, converts the "service generation request" data to match with a communication protocol possible to be commonly used, for example, SOAP or CORBA and communicates with the cooperation management section 54 on the SIP system 12 side present in a separate domain on the network 16. The cooperation management section 66 communicates at time T136 with the cooperation management section 54 to transmit the "service generation request" (Gen. REQ.) issued from the Web browser 68.

The cooperation management section 54 supplies at time T138 a start up signal (Launching) 308 containing the "service generating request" to the proxy UA generating function part 212 of the proxy UA management part 210 to start up the proxy UA generating function part 212, whereby a proxy UA is generated. The proxy UA generating function part 212 starts up the proxy UA registering function part 214 (not shown). The proxy UA registering function part 214 registers at time T140 the service proxy UA in the SIP database 20 managed by the SIP-AP server 22 or the SIP server 18 (Registration 310). With this registration, the Web browser 68 can provide certification for use of the systems.

After the registration, the proxy UA management part 210, when retrieval information is contained in the information included in "service generation request", not shown in the figure, starts up the proxy UA information retrieving function part 224. The proxy UA information retrieving function part 224 instructs a retrieving process (Search 312 at T142) for the retrieving information to the SIP database 20. The SIP database 20 executes the retrieving process according to the supplied retrieving information. The SIP database 20 transmits at time T144 the retrieved result to the proxy UA information retrieving function part 224 of the proxy management part 210 as a response signal (Response). The retrieved result is URI information (Uniform Resource Identifier) generated in the SIP protocol.

The proxy UA information retrieving function part 224 receives the retrieved result and generates a start up signal (Launching) 316 containing the retrieved result (Generated SIP-URI Information) to deliver it to the cooperation management section 54. The cooperation management section 54 is started up by the start-up signal 316 and answers the retrieved result (Generated SIP-URI Information) to the proxy UA management section 66. For this, the cooperation management part 210 uses SOAP or CORBA to communicate with the cooperation management section 66. When the cooperation management section 54 uses, for example, SOAP, the retrieving information supplied based on the HTTP protocol is delivered at time T148 as a response signal (Response), a SOAP response, to the cooperation management section 66 through the network 16. The cooperation management section 66 receives the supplied retrieving information and transmits at time T150 the result of "service generation request" to the proxy UA management part 226 (Response 320).

Subsequently, the proxy UA management part 226 receives the result of the received "service generation request" and sends it out as the executed result of the component application interface 56 back to the Web server 32 or the Web-AP server 36 at time T152 (Response 322). The executed result is the data of user information obtained from the retrieval on the afore-described SIP database.

The Web server 32 or the Web-AP server 36 processes the retried result of the user information, i.e. The generated SIP-URI information into a form available to be displayed by the Web client. In this case, it is processed into data in the SIP-URI form. The Web server 32 or the Web-AP server 36 delivers at time T154 the said data as the service SIP-URI 324 to the Web browser 68. The Web browser 68 displays at time T156 the result of "service generation request" on the monitor.

By operating in that way, the generated SIP-URI information can be supplied to the requesting client in response to the service generation request from the Web browser or the Web client.

Figure 12:
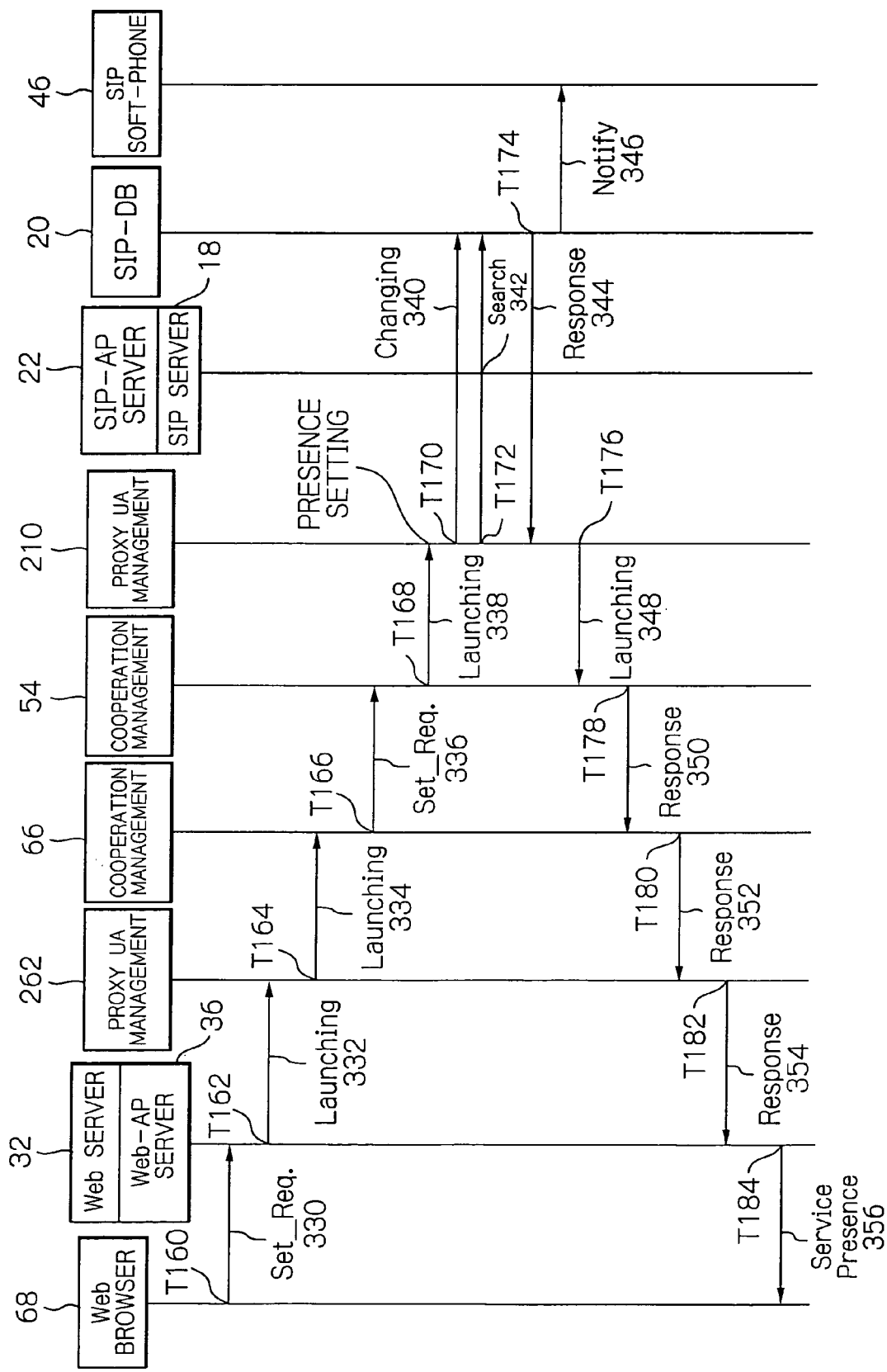
FIG. 12 is a sequence chart, like FIG. 3, useful for understanding the operation procedure for a presence setting request in the service providing system shown in FIG. 9.

Now, operation of the setting of presence in the service providing system 1000 will be described with reference to FIG. 12. The components involved are the same as before, and designated with the same reference numerals.

The Web browser 68 issues at time T160 an execution request for "service presence setting" to the Web server 32/Web-AP server 36. This execution request means to specify SIP-URI, which includes user information as well. The user information includes, as described above, the users' names, addresses and age concerning contracts and information for certification or authentication in use of systems. The information of the service presence setting request includes, for example, "standby for execution", "in processing", "termination", etc., as the content representing the service status. The request is generally executed using GUI supplied form the Web server 32 displayed on the Web browser 68.

The Web server 32/Web-AP server 36 supplies at time T162 a start up signal (Launching) 332 generated based on "service presence setting request" (Set_REQ) 330 to the proxy UA management part 226. The proxy UA management part 226 uses the component AP interface 78 based on the "service presence setting request" (Set_REQ) 330 contained in a start up signal (Launching) 332 to start up the presence setting accessing function part 234, whereby the presence setting accessing function part 234 supplies at time T164 a start up signal (Launching) 334 to the cooperation management section 66 and starts up.

The cooperation management section 66, in order to transmit information to the proxy UA management part 210, uses SOAP or CORBA to communicate at time T166 with the cooperation management section 54 present within another domain on the network 16. By means of that communication, the cooperation management section 54 receives the "service presence setting request" (Set_REQ) 336 issued from the Web browser 68.

The cooperation management section 54 supplies at time T168 a generated start up signal (Launching) 338 to the proxy UA management part 210 to start up the presence setting function part 218. In response to the starting-up, the presence setting function part 218 sets the presence.

The presence setting function part 218 changes (Changing 340) at time T170 the proxy UA presence information stored in the SIP database 20 managed by the SIP-AP server 22/SIP server 18. After the change, the proxy UA information retrieving function part 224 starts up to search (Search 342) the SIP database 20 at time T172. The SIP database 20 delivers (Response 344) at time T174 the retrieved result of the proxy UA presence information to the proxy UA information retrieving function part 224. The proxy UA information retrieving function part 224 supplies the retrieved result of the proxy UA presence information to the presence setting function part 218.

In the meantime, the presence setting function part 218 notifies (Notify 346) change in the presence information registered in the SIP database 20 to, for example, the SIP soft-phone 46. This notification of the change is executed in the number of times corresponding to the number of watchers asynchronously with the sequence of the retrieving process executed after time T174.

The proxy UA management part 210 supplies at time T176 a start up signal (Launching) 348 containing the retrieved result to the cooperation management section 54 to start it up. The cooperation management section 54 uses SOAP or CORBA to communicate (Response 350) at time T178 with the cooperation management section 66. The cooperation management section 66 supplies at time T180 a response signal (Response) 352 to the proxy UA management part 226. The response signal 352 contains the result of "presence setting request" and is transmitted as the result of NG (no good) when the setting fails. The presence setting accessing function part 234 of the proxy UA management part 226 receives the response signal 352 as the result of "service presence setting request".

The proxy UA management part 226 supplies at time T182 the executed result of the component AP interface 78 to the Web server 32/Web-AP server 36 (Response 354). The executed result represents the data of user information obtained by retrieval in the SIP database 20. The Web server 32/Web-AP server 36 converts the executed result into a displayable form. For such a form, there is, for example, a SIP-URI form. The Web sever 32/Web-AP server 36 supplies at time T184 the result of "service presence setting request, i.e., the service presence 356, to the Web browser 68 to display it.

By operating in that way, the setting can be made in the SIP database 20 in the SIP system 12 in response to the presence setting request from the Web browser or the Web client to provide the requesting client with the setting status in the SIP database 20 in the form of response signal.

Figure 13:
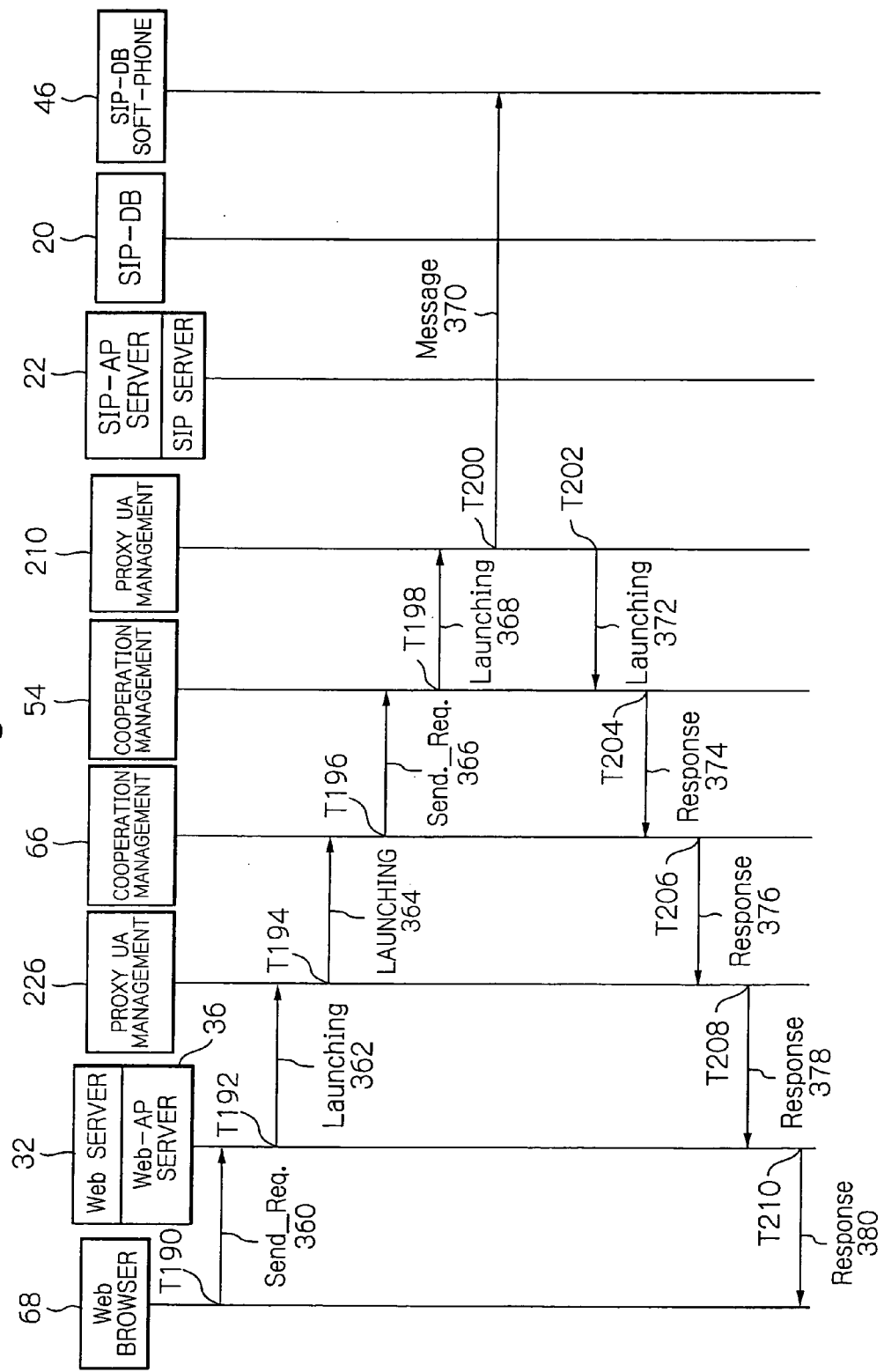
FIG. 13 is a sequence chart, like FIG. 3, useful for understanding the operation procedure for a message transmission request in the service providing system shown in FIG. 9.

Further, the operation for transmitting messages in the service providing system 1000 will be briefly described with reference to FIG. 13. The components used are the same and designated with the same reference numerals.

The Web browser 68 issues at time T190 an execution request for "message transmission" (Send_REQ.) 360 to the Web server 32/Web-AP server 36. The user information and GUI are the same as those described in the previous description for operations. The Web server 32/Web-AP server 36 generates a start up signal (Launching) 362 based on the received "message transmission request" (Send_REQ.) and uses the component AP interface 78 to start up the message transmission accessing function part 236.

The message transmission accessing function part 236 starts up at time T194 the cooperation management section 66 (Launching 364). The cooperation management section 66 uses SOAP or CORBA to communicate at time T196 with the cooperation management section 54 present in the separate domain on the network 16. The cooperation management section 54 receives "message transmission request" (Send_REQ.) 366. The cooperation management section 54 starts up at time T198 the message transmitting function part 220 (Launching 368).

The message transmitting function part 220 delivers at time T200 a message (Message) 370 to the SIP soft-phone 46 that is a SIP client to cause it to be displayed on a monitor. The SIP client corresponds to a message receiver. The message transmitting function part 220 receives a message response from the SIP soft-phone, not shown. The message transmitting function part 220 supplies at time T202 a start up signal (Launching) 372 containing the content of the response to the cooperation management part 210 to start it up.

The cooperation management section 54 uses either SOAP or CORBA in sending out a response of the transmission result to communicate with the cooperation management section 66 (Response 374). The cooperation management section 66 receives the result of "message transmission request" issued from the Web browser 68. The cooperation management section 66 transmits at time T206 it to the message transmission accessing function part 236 of the proxy UA management part 226 (Response 376).

The message transmission accessing function part 236 receives the supplied result of "message transmission request" and delivers it as the executed result of the component AP interface 78 to the Web server 32/Web-AP server 36 at time T208 (Response 378). The Web server 32/Web-AP server 36 processes the result of the message transmission request into a displayable form, for example into a SIP-URI form. The Web server 32/Web-AP server 36 supplies at time T210 a response signal (Response 380) to the Web browser 68. The Web browser 68 displays the result of "message transmission request" on the monitor.

By operating in this way, the proxy UA management parts 210 and 226 and the cooperation management sections 54 and 66 are used to track the service on the Web, so that messages can be transferred from one system to the other system constituting the service providing system 1000, and the thus notified result can also be supplied the transmitter. Further, as the transaction of HTTP protocol is not held for a longtime, it is possible to facilitate an effective use of resources and an establishment of a user interface as a practical application.

Figure 14:
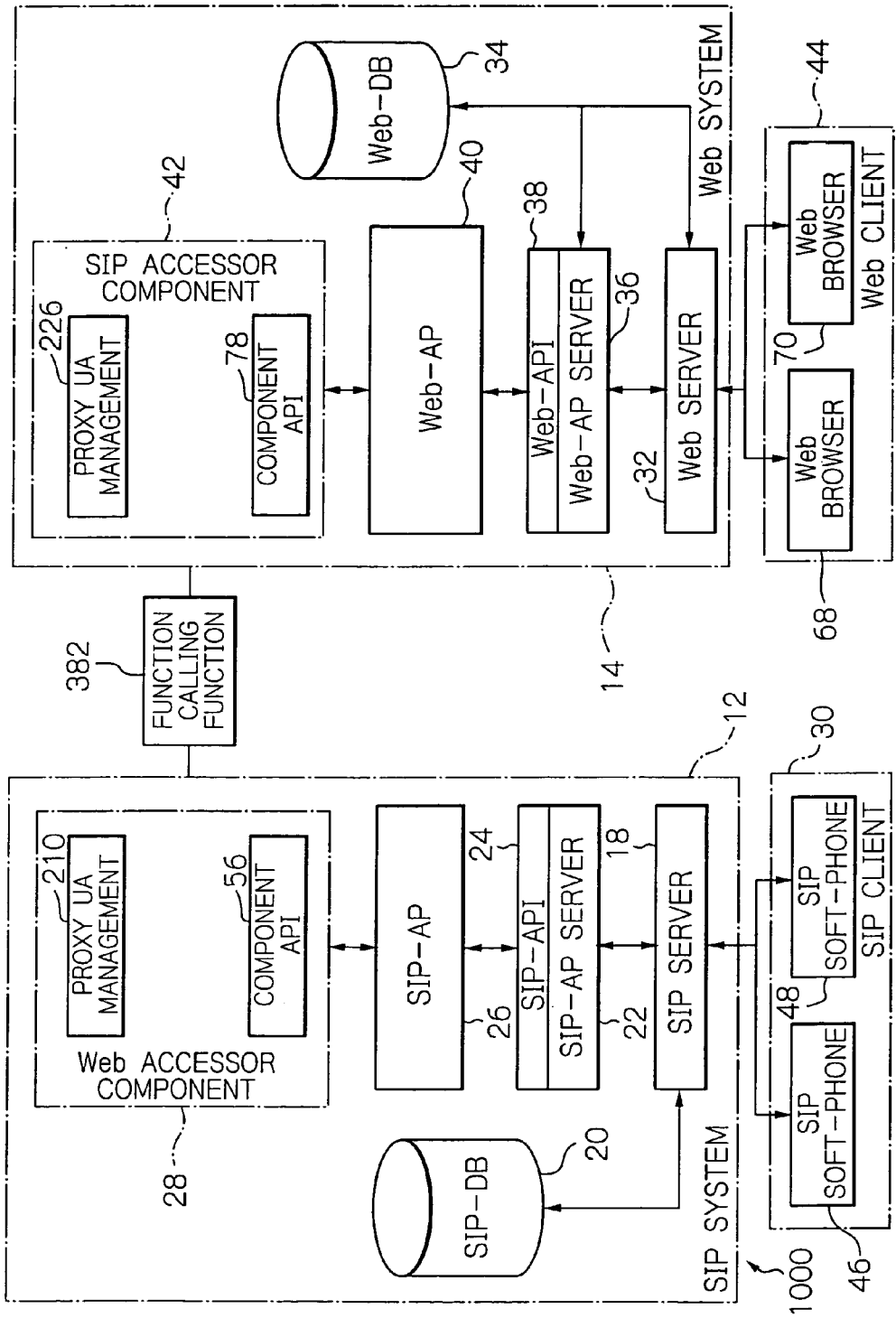
FIG. 14 is a block diagram, like FIG. 1, schematically showing a further alternative embodiment to the configuration shown in FIG. 9.

In the following, another alternative embodiment of a service providing system 1000 to which the present invention is applied will be described with reference to FIG. 14. The service providing system 1000 in accordance with the embodiment complies with the case where the SIP system 12 and the Web system 14 are arranged on a single computer. Here, as for the components, similar parts to those in the previous embodiments are denoted with the same reference numerals to avoid redundant description. The service providing system 1000 is connected by means of the process cooperation on one and the same computer, as seen from FIG. 14. As clearly seen from the connection, the service providing system 1000 in accordance with the embodiment does not have connection through any network such as Internet. The cooperation management sections 54 and 66 shown in FIG. 9 are not intended to be arranged as components, but connected between the Web accessor component 28 and the SIP accessor component 42 through a function-calling functional part 382 for managing cooperation as those components do. The function-calling functional part 382 may be provided with a program, for example, using a call for the function of C Language, or C++ Language, or a method call for Java (trademark) Language. The operation procedure is the same as in the previous embodiments.

Even with that configuration, like in the case of the previous embodiments, applications constructed on the Web and SIP environments can be made cooperative with each other. Thereby, the construction, execution and operation of Web-VoIP cooperative type of applications can be accomplished. Also, in the embodiment, the system structured on an environment with a single computer can accomplish the cooperation of the Web and VoIP applications with each other under an environment with a small-scaled computer.

Figure 15:
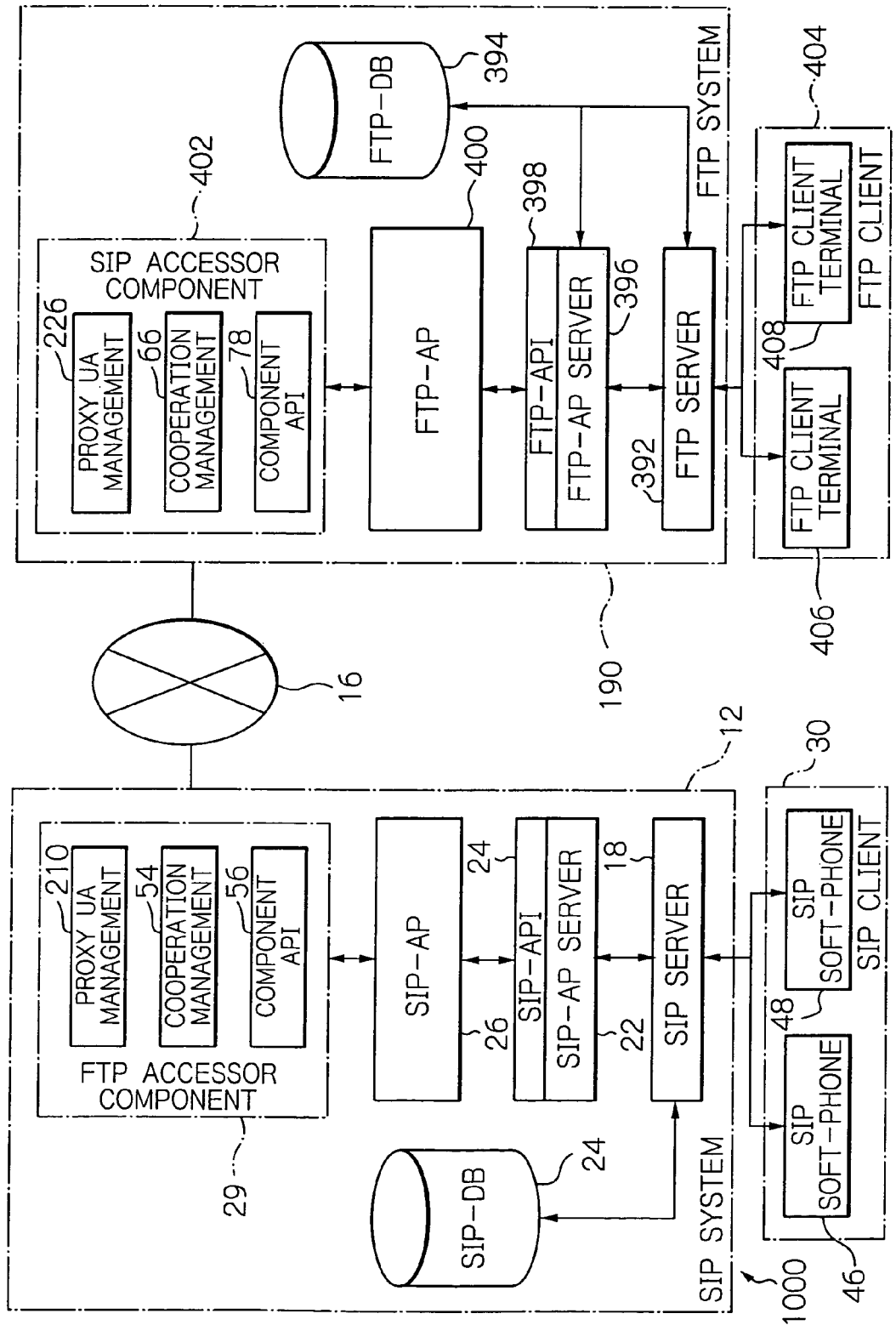
FIG. 15 is a block diagram, like FIG. 1, schematically showing a still further alternative embodiment to the configuration shown in FIG. 9.

Subsequently, with reference to FIG. 15, still another alternative embodiment of a service providing system will be described in which the present invention is applied. The service providing system 1000 of the embodiment has the SIP system 12 and the FTP (File Transfer Protocol) system 390 connected through the network 16. In the embodiment, the SIP system 12 and the FIP system 390 are arranged on network environments belonging to different network domains. Further, the SIP system 12 and the FIP system 390 constitute a structure where they are arranged in a single server computer or on a LAN environment in the same domain, like in the case of the embodiments previously described.

The SIP system 12 may be the same configuration as that in the earliest described embodiment and is denoted with the same reference numeral to omit the redundant description thereof. However, with the instant embodiment, the functions of the accessor component in the SIP system 12 may be the same as those of the Web component 28, but the nomenclature is FTP accessor component 29 because it is not adapted to the Web type but the FTP type.

The other system, the FTP system 390, includes an FTP server 192, an FTP database (FTP-DB) 394, an FTP application server (FTP-AP server) 396, an FTP application interface (FTP-API) 398, an FTP application (FTP-AP) 400, a SIP accessor component 402 and an FTP client 404. In the following, the respective components will specifically be described.

The FIP server 392 is adapted for handling and managing the FTP protocol. The FTP database 394 is a storage for storing therein information managed by the FTP server 392. The information stored therein are file information and the like transferred under the FTP protocol. The FTP-AP server 396 is adapted for operating an application for operating the file transfer protocol (FTP) managed by the FTP server 392. The FTP application interface 398 is provided by the FTP-AP server 396. The FTP application 400 is built by the FTP application interface 398 and operating on the FTP-AP server 396. Such applications are, for example, of the peer-to-peer type of file transfer and the file-sharing type between two parties.

The SIP accessor component 402 is a general name of a component group (software components) with which the FTP application 400 cooperates with the SIP system 12. The SIP accessor component 402 may be the same as the SIP accessor component 42 in the Web system 12 previously described. In other words, it includes the proxy UA management part 226, the cooperation management section 66 and the component AP interface 78. The functions of those components are the same as those in the first embodiment previously described.

The FTP client 404 is connected to the FTP server 392 and is set in an environment for using functions provided by the FTP application 400. The FTP client 404 may have a plurality of FTP client terminals 406 and 408. The FTP client 404 has in general a display screen for displaying text.

With that configuration, it is possible to construct applications for providing a requesting client with obtained information, regardless of using different systems. More specifically, applications constructed on the FTP system 390 and the SIP system 12 come to be cooperative with each other, so that the construction, execution and operation of FTP-VoIP cooperative type of applications can be accomplished. With this construction, the respective systems can share information to be utilized smoothly. Also, the additional installation of the components on the FTP accessor component 29 and the SIP accessor component 402 makes it possible to expand the FTP-VoIP cooperative type of systems. An increase in type of the SIP and FPT applications as well as in type of their components to be installed can implement various types of FTP-VoIP cooperative of applications.

Figure 16:
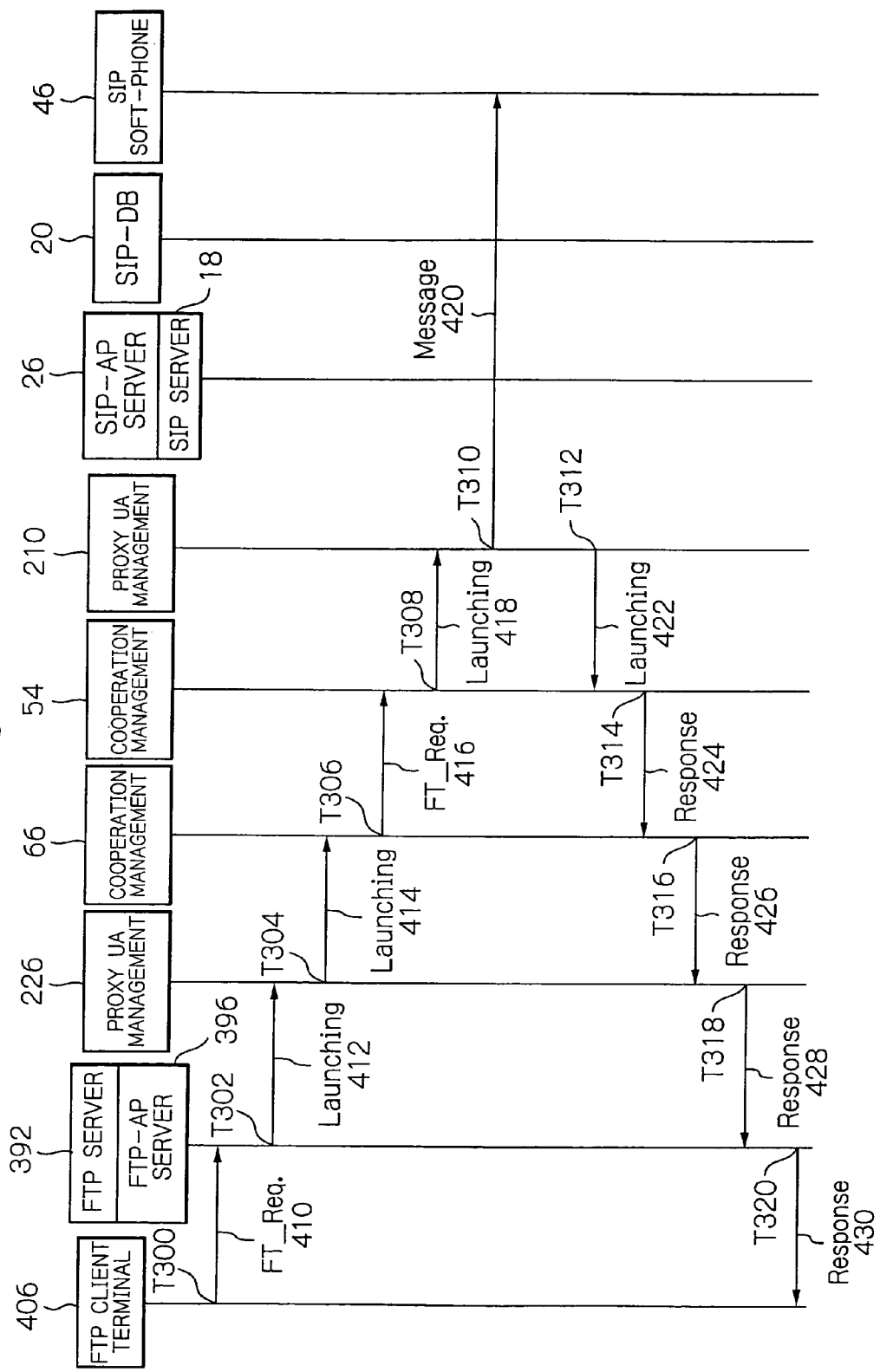
FIG. 16 is a sequence chart, like FIG. 3, useful for understanding the operation procedure for a message transmission request in the service providing system shown in FIG. 15.

In the following, operation for message transmission using the service providing system 1000 in accordance with the above-described embodiment will be described in brief with reference to FIG. 16. The embodiment handles the content of a file as message information of the SIP protocol and executes the process of transmitting a message of the updated information of a file resultant from the file transfer.

The operation procedure starts firstly in such a manner that the FTP client 394 issues at time T300 a request "file transfer request" to the FTP server 392/FTP-AP server 396 through the text display screen (FT_REQ. 410). The FTP server 392/FTP-AP server 396 executes at time T300 file transfer based on the received "file transfer request". Thereafter, the FTP server 392/FTP-AP server 396 reads out the SIP-URI of a receiver to whom the message is to be directed and the content of the message to be transmitted from the content of the transferred file. The FTP server 392/FTP-AP server 396 generates a start up signal (Launching) 412 containing the read-out SIP-URI and content of the transmitted message to send it out at time T302 to the proxy UA management part 226. The proxy UA management part 226 uses the interface function of the component AP interface 78 to supply the start up signal 412 to the message transmission accessing function part 236 to start up the message transmission accessing function part 236.

The message transmission accessing function part 236 generates a start up signal (Launching) 414 for the cooperation management section 66 to supply it at time T304 to the cooperation management section 66. The cooperation management section 66 is started up with the supplied start up signal 414. The cooperation management section 66 uses either SOAP or CORBA to process it into a request signal (FT_REQ.) 416 under the protocol to be used and then communicates at time T306 with the cooperation management section 54 present in a separate domain on the network 16.

The cooperation management section 54 receives the supplied request signal (FT_REQ.) 416 representative of a "file transfer request". The cooperation management section 54 generates a start up signal (Launching) 418 for the message transmission function part 220 in the proxy UA management part 210 based on the received request signal 416. The cooperation management section 54 delivers at time T308 the start up signal 418 to the proxy UA management part 210.

The proxy UA management part 210 uses the supplied start up signal 418 to start up the message transmission part 220. The message transmission function part 220 delivers at time T310 the content of the message contained in the supplied start up signal 418 as message information (Message) 420 to the SIP soft-phone 46. The SIP soft-phone 46 displays the message information as a message receiver.

The message transmission function part 220 receives a response to the received message information 420 from the SIP soft-phone 46 as the result of the message transmission, although not specifically shown. The message transmission function part 220 delivers at time T312 for the cooperation management section 52 a start up signal (Launching) 422 containing a response to the received signal. The cooperation management section 52 starts up on receiving the start up signal 422. The cooperation management section 54, in order to transmit the transmission result to the different FTP system 390 through the network 16, uses either SOAP or CORBA to send out at time T314 to the cooperation management section 66 a signal (Response) 424 which has been processed into the form processable with a protocol selected by the transmission result. The cooperation management 66 transmits at time T316 the result of "file transfer request" (Response) 426 to the message transmission accessing function part 236 of the proxy UA management part 226.

The proxy UA management part 226 receives the result of "file transfer request". The message transmission accessing function 236 supplies at time T318 the received result as the execution result of the component AP interface 78 to the FTP server 392/FTP-AP server 396 (Response 428). The FTP server 392/FTP-AP server 396 supplied with the result processes the result of the message transmission request into a displayable form, for example into a SIP-URI form. The FTP server 392/TP-AP server 396 delivers at time T320 the result of the processed message transmission request (Response) 430 to the FTP client 406. The FTP client 406 displays the result of "file transfer request" in the form of codes.

By operating in this way, it is possible to execute a file transfer process in the FTP system 390, to handle, after the completion, information of the updated file representing the file content as the SIP message information in the SIP system 12, to supply the message transmitted from the FTP system 390 also to the SIP system 12, and for the FTP client 406 to manage the file status as the SIP message transmission result supplied from the SIP system 12.

In addition, the embodiment has been described in which the SIP system 12 is adapted to execute processing appropriate for the service instance from the client of Web system 12 or the FTP system 390, and the requesting client receives a display of the processed result. The processing is, however, not confined to that described above, but it is possible to provide information in the reverse sequence. Specifically, the Web system 12 or the FTP system 12 is caused to execute the proxy UA processing by the SIP system 12.

With the configuration described above, information of the SIP or HTTP protocol can be processed with SOAP/CORBA and the like as communication protocols possible to be commonly handled by using the cooperation management sections 54 and 66 so as to facilitate cooperation between the SIP system 12 and the Web system 14 through the SOAP/CORBA network 16. Consequently, the information transfer on a real time basis can be executed and particularly location information of the SIP client 30 connected to the SIP system is managed in the location information management section 76 to then take management information out of the location information management section 52 in the location information management section 76 to attain information sharing, thereby making it possible to attain efficient advertisement and public relations at the information provider side.

By installing a UA generating application 50 to generate a user agent 51, the user's SIP client can be made to correspond to the service provider side in a one-to-one fashion to thereby make it possible to provide reliable service even in the event of violent increase traffic.

Further, by installing a matching application 74 and a DB retrieving application 170, updated location information supplied from the SIP system 12 can be collated with the retrieved result of the Web database 24 to thereby make it possible to provide the SIP client with correct information.

Still further, by installing a client retrieving application 170, an access can be made to the location information management section 52 of the SIP system 12 in response to a request from the Web client 44 to take the retrieved result out of the SIP database 20 and then supply it to the Web client 44, whereby the Web client 44 can obtain such information as could not have obtained and accomplish efficient operation of the systems using that information.

Prior to staring providing information in the SIP system 12 to the client 30 connected to the SIP system 12, the location information of the client certified and registered can be managed, and a user agent 51 is generated in response to an access from the client to communicate with the client to identify its certification in the SIP system to thereby process to satisfy the instruction to the client 30 and the request for location information managed by the system.

A system may be established in which the first communication protocol is a SIP protocol and the second communication protocol is an HTTP protocol, while the third protocol can be handled like a single system having the SIP system 12 and the Web system 14 cooperative with each other by using a communication protocol of either SOAP or CORBA possible to be commonly handled with either the SIP or the HTTP.

Moreover, according to the information providing method, information can be processed with a communication protocol, for example, a selected one, such as SOAP/CORBA, possible to be handled in common between the SIP system 12 and the Web system 14 using SIP and HTTP protocols, respectively, so as to execute transmission and receiving of the processed information, whereby cooperation between the systems can be facilitated to allow information to be provided on a real time basis.

It is possible merely not only to provide a client with a registered certification or services, but to notify of when a SIP client has moved, and based on the notification correct information can be provided. Thereby, an access is made to the location information management in the SIP system 12 in order to respond to a request from the Web client 44 to then take the retrieved result out of the SIP-DB to provide the Web client 44 with the retrieved result. The Web client 44 can thus obtain such information as has never been obtained before, and attain efficient operation of the systems with use of that information.

Further, in the service providing system 1000, for example when the service instance requested from a client connected to the Web system 14 is executed, the proxy UA management part 226 for the request functions as a proxy UA with the HTTP protocol to start up the cooperation management section 66, the request is processed in the cooperation management section 66 into a request of either the SOAP or CORBA protocol and then sent out to the cooperation management section 54. In the cooperation management section 54, the request is rendered to a request of the SIP protocol, whereupon processing for the request is executed in the proxy UA function associated with the proxy UA management part 210. Then, the processed result is transmitted, as a response, to the requesting client through the proxy UA management part 210, the cooperation management sections 54 and 66 and the proxy UA management part 226 to cause the client to display said result. The proxy UA processing appropriate for the service instance between the different communication protocols is executed in the respective systems, thereby making it possible to provide services that have conventionally been impossible in a conversion gateway as well as to enable effective use of resources and to implement a proper user interface.

The proxy UA management part 21 includes function parts 212-224 for managing generation, registration, deletion and alteration of presence information into that of the user agent as a proxy for the user agent, transmission of messages to specified receivers as the user agent, editing of user information as a proxy for the user agent and retrieval of user information as a proxy for the user agent, respectively. The proxy UA management part 210 includes functional parts 228-240 for accessing to the respective function parts 212-224 of the proxy UA management part 210. Thereby, the HTTP processing for notifying the progress in each processing described above (transaction) particularly in the HTTP environment can quickly be executed.

By using either a SOAP or CORBA protocol that can be handled in common to the SIP and HTTP protocols or the SIP and FTP protocols, information can be transferred even between the systems different in system environment.

The service providing system 1000, by implementing the SIP system 12 and the Web system 14 in the same computer, can be made to have a small-scaled system configuration. Further, the cooperation management sections 54 and 66 provided with a predetermined function call contributes to downsizing of the system due to the reason that it is not necessary for the cooperation management sections 54 and 66 to be implemented as the separate components from each other. By providing a network between the SIP system 12 and the Web system 14 or between the SIP system 12 and the FTP system 390, the respective systems can be dispersedly disposed to provide configuration for the service providing system 1000 with flexibility.

In the service providing system 1000, the SIP system 12 and the Web system 14 as well as the SIP system 12 and the FTP system 390 are composed of computers, respectively, while the program for controlling the system 1000 is functioned as the cooperation management section 54 and the proxy UA management part 210 as well as the cooperation management section 66 and the proxy UA management part 226, thereby making it possible to further downsize the system configuration and to be flexibly adapted to a demand for an increase and a decrease in components, upgrade versions, etc.

Further, according to the service providing method of the invention, in the case of executing a service instance requested from a client connected to, e.g. The Web system, a start up signal (Launching) 204 is generated the proxy accessing function of the proxy user agent (UA) for the request with the HTTP protocol, and the request is processed into a request represented by using either SOAP or CORBA to communicate between the systems. Then, the information is processed in the SIP system 12 by using a proxy UA function corresponding to the request converted into the SIP protocol, and further a start up signal (Launching) 316 containing the response information of the processed result is generated by the proxy UA. The response information is rendered to either SOAP or CORBA to communicate between the systems, whereupon the response information is sent out to the requesting client by the proxy accessing function to cause the client to display it, and the proxy UA processing appropriate for the service instance between the different communication protocols is executed in the respective systems, thereby making it possible to provide services that have conventionally been impossible. Particularly in the Web system 14, it is possible to effectively use resources without holding the processing for a long time.

The proxy user agent executes generation, registration, deletion and alteration of presence information into that of the user agent that is appropriate for the requested service instance as the user agent, transmission of messages to the designees as the user agent, editing of information as the user agent and retrieval of user information as the user agent, respectively. It executes the proxy access to generation, registration, deletion, alteration of presence information, transmission of messages, editing of user information and retrieval of user information, respectively. It is thereby made possible to quickly process an HTTP protocol for notifying the user of the progress in each processing described above (transaction) in the HTTP environment.

Moreover, the service providing method, by using either the SOAP or CORBA protocol that can be handled in common to the SIP and the HTTP protocols or the SIP and HTTP protocols, information can be transferred even between the systems different in system environment.

The present invention is not confined to the embodiment described above, but is able to made applications to be built cooperate with each other by a protocol for working different protocols cooperatively, if cooperation is managed with the protocol used, thereby making it possible to attain the construction, execution and operation of the cooperative type of applications.

The entire disclosure of Japanese patent application Nos. 2003-350576 and 2003-371642 filed on Oct. 9 and 31, 2003, respectively, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A method of providing information to communicate with first and second clients to provide information as service, comprising:

a first step of preparing a first system operating based on a first communication protocol and connected to the first client, and a second system operating based on a second communication protocol and connected to the second client;

a second step of converting first information to be transmitted from the first system to second information handled with a third communication protocol that cooperates in common with the first communication protocol and the second communication protocol, and transmitting the second information;

a third step of converting the second information fed from the second system to third information handled with the second communication protocol and outputting the third information;

a fourth step of converting fourth information received by the second system and based on the second communication protocol to fifth information handled with the third communication protocol and transmitting the fifth information;

a fifth step of processing the fifth information fed to the first system into sixth information handled with the first communication protocol and outputting the sixth information;

a sixth step of managing in the first system location information of a client authenticated and registered before information transfer is initiated to the first client;

a seventh step of generating a user agent in response to an access from the client to communicate with the client;

an eighth step of updating, when the first client notifies the first system of a status change, information according to the status change notified;

a ninth step of informing the user agent of the updated information;

a tenth step of requesting information retrieval in the first system by the user agent;

an eleventh step of requesting information retrieval in the second system in response to a request for the information retrieval in the first system;

a twelfth step of performing said second and third steps in order for the requested information retrieval in the second system, and thereafter transmitting a request for information retrieval in the second system on the second communication protocol to starting up information management in the second system;

a thirteenth step of developing the request for the information retrieval in response to the information management started up, and starting up as an application a collating function and a retrieval function of a database in the second system;

a fourteenth step of requesting retrieval of the database;

a fifteenth step of collating a retrieved result of the database with the updated information and performing said fourth and fifth steps in order for collated information, and thereafter supplying information manage in the first system with the collated information according to the first communication protocol;

a sixteenth step of delivering the collated information to the user agent after said fifteenth step; and a seventeenth step of supplying the collated information as a message from the user agent to the first client having notified the status change in said eighth step, wherein said first system includes a first location manager for managing location information of the first client, wherein said first location manager comprises:
  a registering section for registering location information of a user;
  an eliminating section for deleting the registered location information;
  a retrieving section for retrieving the registered location information; and
  an updating section for editing the registered location information, wherein said second system includes a second location manager operative in response to a request from the second client for accessing to said first location manager to manage the location information of the first client obtained from said first location manager, and wherein said second location manager furthermore comprises:
  a registration access section for accessing to the registering section;
  an elimination access section for accessing to the eliminating section;
  a retrieval access section for accessing to the retrieving section; and
  an update access section for accessing to the updating section.

2. The method as defined in claim 1, further comprising:

an eighteenth step of starting up, when the second client sends out a notice of a request for starting up an application included in the second system, the application in response to the request for the starting up;

a nineteenth step of developing a request for retrieval of information of a client managed by the first system with the started-up application;

a twentieth step of performing said fourth and fifth steps in order for the request for the information retrieval from the second system, and thereafter delivering the request for the information retrieval of the user agent in the first system to the information management in the first system;

a twenty-first step of instructing a retrieval of a database in the first system in response to the request for the information retrieval;

a twenty-second step of searching the database to deliver a retrieved result to the information management in the first system to manage the result;

a twenty-third step of performing said second and third steps for the retrieved result in order, and thereafter managing in the second system information result on the second communication protocol in the second system to transmit the information result; and a twenty-fourth step of supplying the second client from the second system with the information result of as client information in the first system.

* * * * *